US009391852B2

(12) United States Patent
Yasuie et al.

(10) Patent No.: US 9,391,852 B2
(45) Date of Patent: Jul. 12, 2016

(54) COMPUTER-READABLE RECORDING MEDIUM AND INFORMATION PROCESSING APPARATUS

(71) Applicant: FUJITSU LIMITED, Kawasaki-shi, Kanagawa (JP)

(72) Inventors: Takeshi Yasuie, Kawasaki (JP); Taichi Sugiyama, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 14/069,671

(22) Filed: Nov. 1, 2013

(65) Prior Publication Data

US 2014/0189009 A1    Jul. 3, 2014

(30) Foreign Application Priority Data

Dec. 28, 2012   (JP) .................................. 2012-288442

(51) Int. Cl.
*G06F 15/16* (2006.01)
*H04L 12/24* (2006.01)
*H04L 12/26* (2006.01)

(52) U.S. Cl.
CPC ........... *H04L 41/5067* (2013.01); *H04L 43/026* (2013.01); *H04L 43/028* (2013.01); *H04L 43/087* (2013.01); *H04L 43/0829* (2013.01); *H04L 43/0864* (2013.01)

(58) Field of Classification Search
CPC ............ H04L 41/5067; H04L 43/0829; H04L 43/0864; H04L 43/087; H04L 43/026; H04L 43/028

See application file for complete search history.

(56) References Cited

U.S. PATENT DOCUMENTS

| 2004/0030797 A1* | 2/2004 | Akinlar | H04L 47/10 709/232 |
|---|---|---|---|
| 2004/0073655 A1* | 4/2004 | Kan | H04L 12/2602 709/224 |
| 2004/0090923 A1* | 5/2004 | Kan | H04L 12/2602 370/252 |
| 2006/0239271 A1* | 10/2006 | Khasnabish | H04L 45/00 370/395.21 |
| 2008/0080376 A1* | 4/2008 | Adhikari | H04L 12/2602 370/231 |
| 2009/0028062 A1* | 1/2009 | Meloche | G06Q 40/00 370/252 |
| 2009/0103449 A1* | 4/2009 | Claise | H04L 41/5003 370/253 |
| 2011/0314145 A1* | 12/2011 | Raleigh | H04L 41/0893 709/224 |
| 2012/0215911 A1* | 8/2012 | Raleigh | H04L 12/14 709/224 |
| 2012/0221955 A1* | 8/2012 | Raleigh | H04M 15/00 715/736 |
| 2013/0128742 A1* | 5/2013 | Yu | H04L 47/10 370/235 |
| 2014/0140213 A1* | 5/2014 | Raleigh | H04L 67/2804 370/235 |
| 2015/0143456 A1* | 5/2015 | Raleigh | H04L 63/20 726/1 |

FOREIGN PATENT DOCUMENTS

| JP | 10-023107 | 1/1998 |
| JP | 2008-271346 | 11/2008 |

\* cited by examiner

*Primary Examiner* — Ario Etienne
*Assistant Examiner* — Andrea Hurst
(74) *Attorney, Agent, or Firm* — Fujitsu Patent Center

(57) ABSTRACT

A computer is disclosed that performs a verification process. The computer analyzes quality characteristics of communication for each of predetermined quality analysis subjects from actual capture data. The computer generates send data based on the actual capture data and an exchanging message which is acquired when a reproduced operation is verified based on the actual capture data. The computer sends the send data to a verification subject apparatus at sending timing based on the quality characteristics. The computer receives response data from the verification subject apparatus. The computer verifies an operation of the verification subject apparatus.

9 Claims, 20 Drawing Sheets

FIG.16

| No. | PACKET ACQUIRED TIME | PACKET INFORMATION ||||| |
|---|---|---|---|---|---|---|
| | | INITIATOR ADDRESS | DESTINATION ADDRESS | INITIATOR PORT NUMBER | DESTINATION PORT NUMBER | PAYLOAD INFORMATION |
| 1 | 13:00:00.000000 | 10.2.1.100 | 10.1.1.1 | 10001 | 80 | Syn |
| 2 | 13:00:00.001000 | 10.1.1.1 | 10.2.1.100 | 80 | 10001 | Syn-Ack |
| 3 | 13:00:00.021000 | 10.2.1.100 | 10.1.1.1 | 10001 | 80 | Ack |
| 4 | 13:00:00.022000 | 10.2.1.100 | 10.1.1.1 | 10001 | 80 | GET /login.ja |
| 5 | 13:00:00.023000 | 10.1.1.1 | 10.2.1.100 | 80 | 10001 | HTTP 1.1/200 OK |
| 6 | 13:00:00.043000 | 10.2.1.100 | 10.1.1.1 | 10001 | 80 | Ack |
| 7 | 13:00:01.000000 | 10.3.241.100 | 10.1.1.1 | 15001 | 80 | GET /index.ja |
| 8 | 13:00:01.001000 | 10.1.1.1 | 10.3.241.100 | 80 | 15001 | HTTP 1.1/200 OK |
| 9 | 13:00:04.001000 | 10.1.1.1 | 10.3.241.100 | 80 | 15001 | HTTP 1.1/200 OK |
| 10 | 13:00:04.051000 | 10.3.241.100 | 10.1.1.1 | 15001 | 80 | Ack |
| 11 | 13:00:05.000000 | 10.2.1.200 | 10.1.1.1 | 17001 | 80 | GET /index.ja |
| 12 | 13:00:05.001000 | 10.1.1.1 | 10.2.1.200 | 80 | 17001 | HTTP 1.1/200 OK |
| 13 | 13:00:05.023000 | 10.2.1.200 | 10.1.1.1 | 17001 | 80 | Ack |
| 14 | 13:00:06.000000 | 10.1.1.1 | 10.2.2.100 | 19001 | 80 | GET /index.ja |
| 15 | 13:00:06.001000 | 10.1.1.1 | 10.2.2.100 | 80 | 19001 | HTTP 1.1/200 OK |
| 16 | 13:00:06.025000 | 10.2.2.100 | 10.1.1.1 | 19001 | 80 | Ack |
| 17 | 13:00:07.000000 | 10.2.1.100 | 10.1.1.1 | 20001 | 80 | GET /index.ja |
| 18 | 13:00:07.001000 | 10.1.1.1 | 10.2.1.100 | 80 | 20001 | HTTP 1.1/200 OK |
| 19 | 13:00:07.023000 | 10.2.1.100 | 10.1.1.1 | 20001 | 80 | Ack |
| ... | ... | ... | ... | ... | ... | ... |

FIG.17

| CLIENT ADDRESS | ACTUAL RTT QUALITY (msec) | ACTUAL LOSS QUALITY (LOSS RATE UP/DOWN) (%) | ACTUAL JITTER QUALITY (STANDARD DEVIATION) (msec) |
|---|---|---|---|
| C1 | 10 | 1.0/1.5 | 2.0 |
| C2 | 20 | 0/0 | 1.5 |
| C3 | 50 | 3.5/0 | 6.0 |
| ... | ... | ... | ... |

FIG.18

| BASE NAME | BASE ADDRESS |
|---|---|
| Tokyo HEADQUARTERS | 10.1.0.0/16 |
| Osaka BRANCH | 10.2.0.0/16 |
| Fukuoka BRANCH | 10.3.240.0/20 |
| ... | ... |

FIG.19

| SUBNET NAME | SUBNET ADDRESS | SUBNET MASK LENGTH |
|---|---|---|
| TOKYO TECHNICAL DIVISION | 10.1.1.0 | 24 |
| TOKYO SALES DIVISION | 10.1.2.0 | 25 |
| TOKYO GENERAL AFFAIRS DIVISION | 10.1.2.128 | 25 |
| ... | ... | ... |

FIG.20

| QUALITY INTEGRATION SUBJECT TO APPLY BASED ON DYNAMIC DETERMINATION RESULT | RTT QUALITY (msec) | | | |
|---|---|---|---|---|
| | BASE ID AND INTEGRATION QUALITY | SUBNET ID AND INTEGRATION QUALITY | CLIENT ID AND INTEGRATION QUALITY | CONNECTION ID AND INTEGRATION QUALITY |
| BASE ID_P1 | P1(20msec) | S1(19msec) | T1(19msec) | C1(18msec) |
| | | | | C2(20msec) |
| | | | T2(20msec) | C3(20msec) |
| | | | T3(21msec) | C4(20msec) |
| BASE ID_P1 | P1(20msec) | S2(20msec) | T4(20msec) | C5(20msec) |
| | | | T5(20msec) | C6(20msec) |
| | | | T6(20msec) | C7(20msec) |
| SUBNET ID_S3 | | S3(30msec) | T7(30msec) | C8(30msec) |
| | | | | C9(30msec) |
| SUBNET ID_S3 | | | T8(30msec) | C10(30msec) |
| CLIENT ID_T9 | | | T9(40msec) | C11(40msec) |
| CLIENT ID_T10 | | | T10(20msec) | C12(20msec) |
| BASE ID_P2 | P2(50msec) | S4(51msec) | T11(51msec) | C13(50msec) |
| | | | | C14(51msec) |
| BASE ID_P2 | P2(50msec) | S5(49msec) | T12(49msec) | C15(49msec) |
| | | | T13(50msec) | C16(50msec) |
| ... | ... | | | |

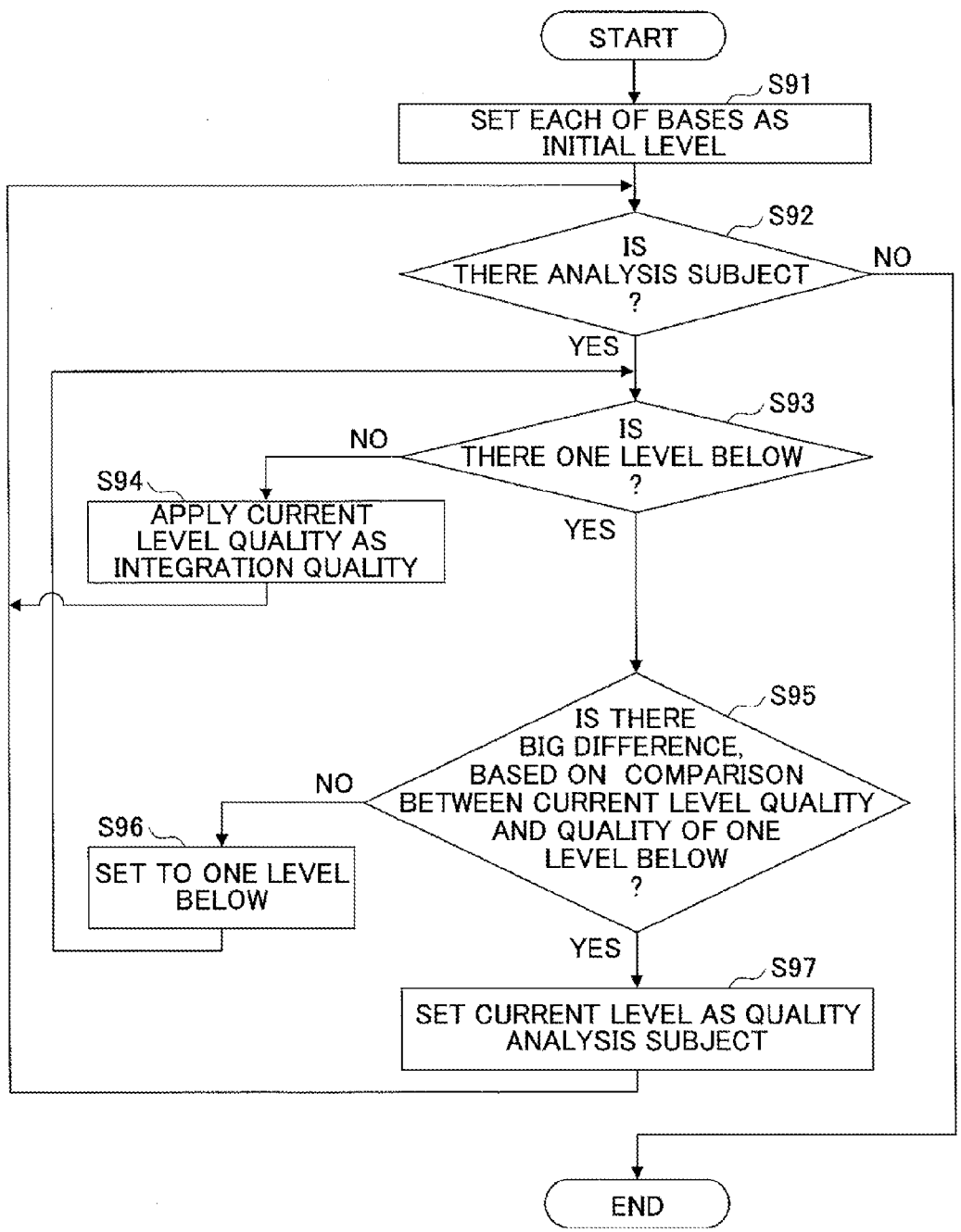

COMPUTER-READABLE RECORDING MEDIUM AND INFORMATION PROCESSING APPARATUS

CROSS-REFERENCE TO RELATED APPLICATIONS

This patent application is based upon and claims the benefit of priority of the prior Japanese Patent Application No. 2012-288442 filed on Dec. 28, 2012, the entire contents of which are incorporated herein by reference.

FIELD

The embodiment discussed herein is related to a computer-readable recording medium and an information processing apparatus for reproducing an actual operation.

BACKGROUND

Conventionally, there has been desired a technology for testing and verifying in a short time whether a server or the like operates in the same manner as before maintenance (whether a functional aspect or a performance aspect is degraded); after the maintenance, a patch is applied, firmware is updated, a virus definition is updated, and the like with respect to the server or the like. Also, there has been desired a technology for extracting data in a predetermined period (which may be a failure period or the like) from capture data of a system operation in a service (hereinafter, simply called "actual capture data"), and for confirming a reproduced operation. Furthermore, in a case of migration of a server system (related to a server integration from physical servers into a virtual server, migration to a cloud server, and the like), instead of stopping an actual server which is currently working, there has been desired a technology to test in a short time whether an operation is performed at a server of a migration destination similarly to a current operation.

For that purpose, a technology exists in that received time data when a request message is received are acquired and retained, a sending time of communication data is determined based on the received time data being retained when a communication simulation is conducted, and the communication data are simulated based on time information. Also, a load test system is known in which circuit switching and an element of packet switching are included in a base station which includes a High Speed Downlink Packet Access (HSDPA) function, so as to perform a load test at both sides (refer to Patent Document 1).

PATENT DOCUMENT

Patent Document 1: Japanese Laid-open Patent Publication No. H10-23107

SUMMARY

According to one aspect of the embodiment, there is provided a non-transitory computer-readable recording medium storing a program which, when executed by a computer, causes the computer to perform a verification process including: analyzing quality characteristics of communication for each of predetermined quality analysis subjects from actual capture data; generating send data based on the actual capture data and an exchanging message which is acquired when a reproduced operation is verified based on the actual capture data; sending the send data to a verification subject apparatus at sending timing based on the quality characteristics; receiving response data from the verification subject apparatus; and verifying an operation of the verification subject apparatus.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 16 is a diagram illustrating an example of actual capture data;

FIG. 17 is a diagram illustrating an example of actual quality characteristic information;

FIG. 18 is a diagram illustrating an example of base management information;

FIG. 19 is a diagram illustrating an example of subnet management information;

FIG. 20 is a diagram for explaining a dynamic determination of quality analysis subjects; and FIG. 21 is a flowchart for explaining an example of a dynamic determination process of the quality analysis subjects.

DESCRIPTION OF EMBODIMENTS

In related art as disclosed in Patent Document 1, communication data are extracted at a request message level (preferably, L7) from actual capture data (capture data of a system operation in a service), and transmission is conducted based on received time information. However, below a Transmission Control Protocol (TCP) level (preferably, L4), it is preferable to perform transmission in accordance with a request sequence or a response sequence between a verification apparatus and a target server. Otherwise, if the above described condition is not satisfied, a difference is caused between response data sizes, response timings, or the like. As a result, a reproduction verification operation is not preferably conducted. Therefore, even if the technology disclosed in Patent Document 1 is applied, the reproduction verification operation is not preferably performed.

In the following, embodiments of the present invention will be described with reference to the accompanying drawings.

<Outline Configuration Example of Verification System>

Figure 1:
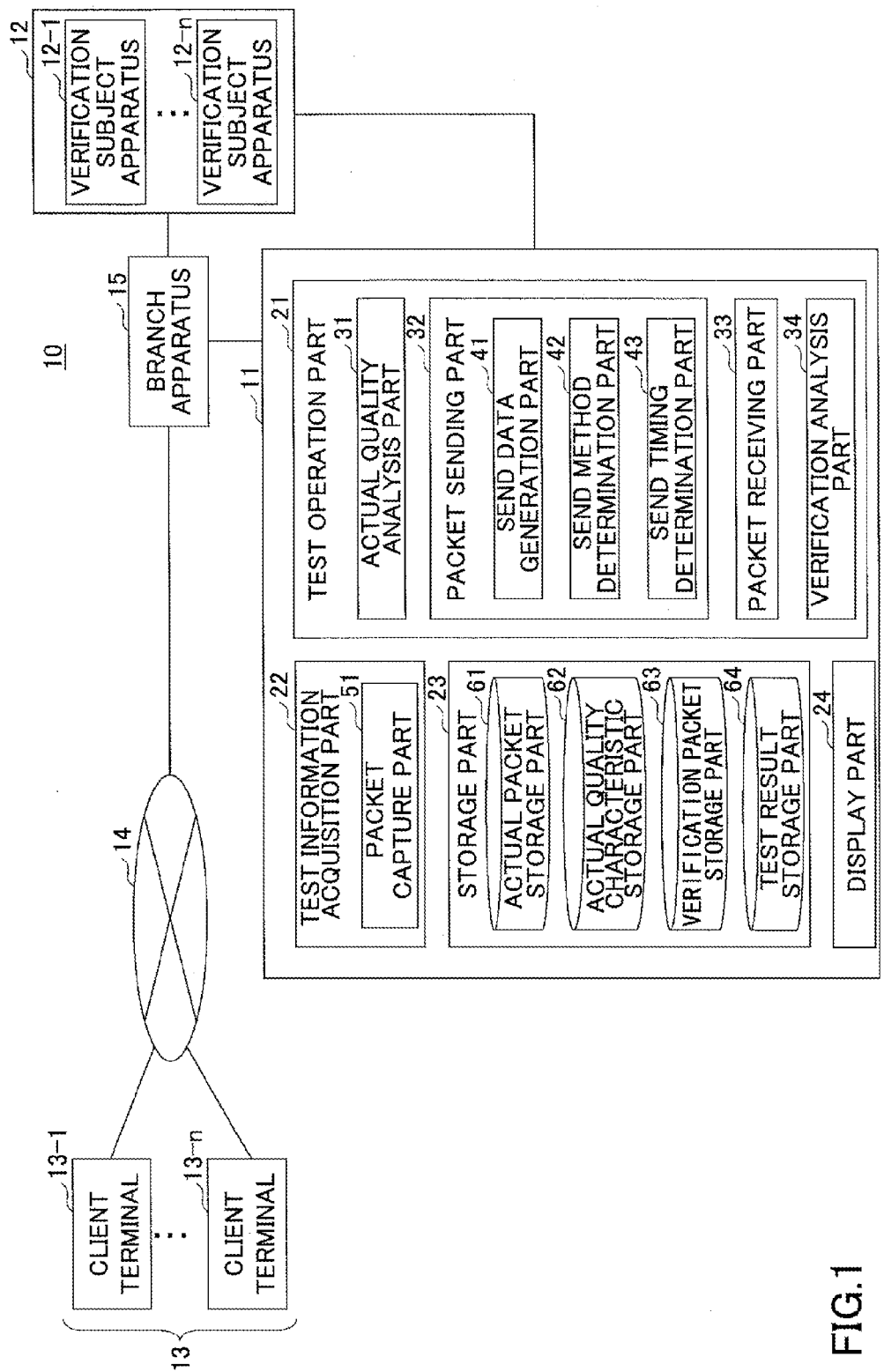
FIG. 1 is a diagram illustrating an outline configuration example of a verification system.

FIG. 1 is a diagram illustrating an outline configuration example of a verification system 10. The verification system 10 includes a verification apparatus 11 as an example of an information processing apparatus, a verification subject apparatus 12, and one or multiple client terminals 13-1 to 13-$n$ (hereinafter, generically called "client terminal(s) 13" as appropriate). In the verification system 10 depicted in FIG. 1, the client terminals 13 and the verification subject apparatus 12 are connected via a communication network 14 in a state capable of mutually sending and receiving data. In the verification system 10 depicted in FIG. 1, a branch apparatus 15 or the like is provided in order to capture communication data which are sent and received between the client terminals 13 and the verification subject apparatus 12.

The verification apparatus 11 captures communication data (actual packets and the like) in an actual environment with respect to the verification subject apparatus 12 which is determined beforehand. Also, the verification apparatus 11 extracts capture data corresponding to a predetermined extraction condition, which is defined for each of bases where the client terminals 13 are located or for each of the client terminals 13, from captured communication data.

The verification apparatus 11 may analyze quality characteristics on communication from the extracted data. Then, the verification apparatus 11 reproduces the same quality as that of an actual sequence, based on analyzed quality characteristic information in a verification sequence. The verification sequence may correspond to a sequence of exchanging (sending and received) messages when a reproduced operation is verified based on the actual capture data.

Also, the verification apparatus 11 sends and receives packets to/from the verification subject apparatus 12 which is defined beforehand, by using reproduced data, and verifies operations (behaviors) of the verification subject apparatus 12 and the entire system with respect to a result of sending and receiving packets. In a case of reproducing and verifying an actual operation in a verification operation, the verification apparatus 11 may verify operations and the like related to exchanging data by directly accessing the predetermined verification subject apparatus 12, instead of accessing through the branch apparatus 15.

The verification subject apparatus 12 is regarded as an actual server which exchanges data with the client terminals 13 for carrying out actual operations. Also, the verification subject apparatus 12 is regarded as a verification server of which operations are verified by the verification apparatus 11. Also, the verification subject apparatus 12 may include both functions of the above described actual server and the verification server. Alternatively, the actual server and the verification server may be individual servers separated from each other, or may be implemented in one apparatus.

The verification subject apparatus 12 may be formed by multiple server groups (verification subject apparatuses 12-1 to 12-$n$ depicted in FIG. 1). The verification subject apparatus 12 may include a management server for managing each of client terminals 13, a database server for managing information sent from each of the client terminals 13 by a database, an operational processing server which conducts various operational processes, and the like. However, servers included in the verification subject apparatus 12 are not limited to these mentioned servers. Alternatively, the verification subject apparatus 12 may be a cloud server in which the above described various servers may be selectively integrated, or may be an apparatus other than servers.

Each of the client terminals 13 exchanges data with the verification subject apparatus 12 (preferably, the actual server) and the like through the communication network 14 in an actual system operation. In the actual system operation, a client terminal is not limited to one client terminal 13. Multiple client terminals 13-1 to 13-$n$ may be connected through the communication network 14. In this case, one or more of the multiple client terminals 13-1 to 13-$n$ may be located at one base or each of multiple bases which is determined beforehand. The base may correspond but be not limited to a point (location) having different communication quality (environment). The client terminals 13 may form one or multiple sub-networks (hereinafter, called "subnet") by a predetermined unit (preferably, each section, each floor, or the like) per base.

Each of the client terminals 13 may correspond to a general purpose apparatus or server such as a personal computer (PC) or the like. Furthermore, each of the client terminals 13 may correspond to a communication terminal or the like of a tablet terminal or the like.

The communication network 14 may be realized by a network typified by the Internet, a Local Area Network (LAN), or the like. The communication network 14 may be wired or wireless, or may include both.

The branch apparatus 15 branches the communication data between the client terminals 13 and the verification subject apparatus 12 and captures the communication data. It is preferable to arrange the branch apparatus 15 at a side of the verification subject apparatus 12 where the communication data are integrated so as to easily capture the communication data sent from the multiple client terminals 13-1 to 13-$n$ arranged at respective bases. However, an arrangement of the branch apparatus 15 is not limited to this arrangement depicted in FIG. 1.

The branch apparatus 15 may be, but is not limited to, a tap (TAP), a switch (SW), or the like.

The communication data in the actual operation are sent and received by the client terminals 13. However, the communication in the verification operation are sent and received by the verification apparatus 11. In this case, the verification system 10 analyses quality of the communication and the like based on the predetermined condition by using actual capture data. The verification system 10 generates send data of the verification operation based on the verification sequence, simulates actual quality for which a send method and send timing are analyzed, and reproduces the same environment as that of the actual operation.

In a send data generation of the verification operation, particular information in a system or a session is generated by statically converting, or dynamically converting from information of receive response data, from the actual operation to the verification operation. As a data example of a conversion subject, there are a Media Access Control (MAC)/Internet Protocol (IP) address (fix conversion) and the like. As another data example of the conversion subject, there are a TCP sequence number (dynamic conversion), a HyperText Transfer Protocol (HTTP) header, Cookie information (dynamic conversion) and the like. However, the conversion subject is not be limited to the above described data.

Moreover, a quality analysis subject of the actual capture data may be, but is not limited to, each of the client terminals 13 (client addresses), each of subnets (subnet addresses), each of bases (base addresses), each connection or each sequence for each of the client terminals 13, or the like. By this configuration, data may be integrated in an order of "base address"→"subnet address"→"client address"→"connection"→"sequence". As a result, it is realized to carry out a verification based on quality and an environment which are finely reproduced by steps.

Various variations may be considered but are not limited for timing of the quality analysis of the actual capture data and aggregation contents. First, all actual capture data may be analyzed for a predetermined period (preferably, one day). Average qualities (preferably, an average Round Trip Time (RTT) and an average loss rate) may be retained for each of predetermined quality analysis subjects. Therefore, it is possible to perform reproduction verification while reading out the average qualities retained for each of quality analysis subjects when verification is operated. The average quality may be acquired by but is not limited to being acquired by using a worst quality (a maximum RTT, a maximum loss rate, or a maximum jitter), a best quality (a minimum RTT, a minimum loss rate, or a minimum jitter), or the like. Also, the quality analysis is performed at the same time while reading out the actual capture data at real time when the verification is being operated. It is possible to reproduce and verify the quality at that time. However, the quality analysis is not limited to this method.

<Functional Configuration Example of Verification Apparatus 11>

A functional configuration example of the verification apparatus 11 depicted in FIG. 1 will be described. The verification apparatus 11 depicted in FIG. 1 includes a test operation part 21, a test information acquisition part 22, a storage part 23, and a display part 24. The test operation part 21 includes an actual quality analysis part 31, a packet sending part 32, a packet receiving part 33, and a verification analysis part 34. The packet sending part 32 includes a send data generation part 41, a send method determination part 42, and a send timing determination part 43. The test information acquisition part 22 includes a packet capture part 51. The storage part 23 includes an actual packet storage part 61, an actual quality characteristic storage part 62, a verification packet storage part 63, and a test result storage part 64.

The test operation part 21 reproduces the quality characteristics of an analysis result acquired from the actual capture data or the capture data in response to an instruction from a user or the like of the verification apparatus 11, and carries out various verification tests such as a load test and the like which are set beforehand for the verification subject apparatus 12 and the entire system.

The actual quality analysis part 31 analyzes the quality characteristics (preferably, the RTT, the loss rate, the jitter, and the like) of the actual capture data (communication packet data in the actual operation) stored in the actual packet storage part 61. At this time, it is possible for the actual quality analysis part 31 to analyze for each of predetermined quality analysis subjects (levels). The predetermined quality analysis subjects may preferably correspond to, but are not limited to, the bases where the client terminals 13 are arranged, the subnets located at respective bases, the client terminals 13 themselves, the connections respective to the client terminals 13, data corresponding to the sequences with respect to the connections, and the like. Details of the above described actual capture data will be described later.

As a reproduction process in the verification operation, the packet sending part 32 generates the send data based on the verification sequence and the like, and operates the send method and the send timing so as to simulate analyzed actual qualities and the like. The packet sending part 32 sends the actual capture data, which are stored in the actual packet storage part 61, to the predetermined verification subject apparatus 12. The packet sending part 32 may send the actual capture data with respect to all verification subject apparatus 12-1 to 12-n depicted in FIG. 1, or may send the actual capture data to at least one of the verification subject apparatus 12-1 to 12-n.

In the packet sending part 32, the send data generation part 41 generates data to send to the verification subject apparatus 12. The send data generation part 41 may convert verification sequence information (pertinent to data previously received) and the like into information in a data format to which the verification subject apparatus 12 of the verification operation are capable of responding, and generates the send data in which a portion of a header (destination information) and the like is converted.

The send method determination part 42 may determine a method for sending verification data from the actual quality analysis information. A send method in a similar actual environment pertinent to a predetermined client terminal 13 and the verification subject apparatus 12 may be applied. The send method is not limited to this method. The send method corresponds to at least one of a communication level (preferably, L4, L7, or the like), a protocol for communication, a determination whether or not to send for each set of packet data (selection of packet data to send), and the like. However, the send method is not limited to one of these.

The send timing determination part 43 determines timing to send data based on the actual quality analysis information. The send timing determination part 43 may set the send timing similar to that in the actual environment based on the quality analysis information analyzed from the actual capture data with respect to the predetermined client terminal 13. A setting of the send timing is not limited to this manner.

As described above, in order to carry out the reproduction process in the verification operation, the packet sending part 32 generates the send data based on the verification sequence and operates the send method and the send timing to simulate the analyzed actual qualities.

The packet receiving part 33 receives a response packet with respect to the send packet for the verification which is sent from the packet sending part 32. A received packet may be stored in the verification packet storage part 63.

The verification analysis part 34 conducts an analysis of the send packet and the receive packet of the verification based on the predetermined condition. The verification analysis part 34 may perform various analyses such as a response delay and the like due to some load on the verification subject apparatus 12 and the entire system in a case in which timing of sending or receiving predetermined data in the verification operation is delayed more than timing of sending or receiving the same data in the actual operation.

The test information acquisition part 22 acquires the communication data between each of the client terminals 13 and the verification subject apparatus 12 (which may be an actual server or the like). The packet capture part 51 of the test information acquisition part 22 captures the communication packets between each of the client terminals 13 and the actual server. The test information acquisition part 22 may acquire the entire capture data by segmenting at predetermined intervals. Alternatively, the test information acquisition part 22 may acquire the capture data for each of predetermined bases, each of the subnets, each of the connections, or each of the verification subject apparatuses 12, based on address information included in the communication packet. An acquired packet may be stored in the actual packet storage part 61.

The actual packet storage part 61 of the storage part 23 stores a capture result received from the verification subject apparatus 12 which operates as the actual server. The actual packet storage part 61 may retain the entire communication sequence as the actual capture data between each of the client terminals 13 and the verification subject apparatus 12. Also, the actual packet storage part 61 may store the actual capture data with respect to each of the predetermined bases, each of the subnets, or each of the connections, or data acquired during a predetermined period (preferably, every one hour).

The actual quality characteristic storage part 62 stores actual capture quality analysis information which is acquired by the actual quality analysis part 31. The verification packet storage part 63 stores packet data which are subject to verification and are acquired by the packet receiving part 33. The test result storage part 64 may store a verification test result of the quality characteristics.

The display part 24 displays a screen to set setting information for the verification process of the verification subject apparatus 12, a screen of a verification result, and the like. The display part 24 may display, on a display screen, a cursor, an icon, a tool box, a document, an image, data such as function information, and the like, which may be operated by an input device such as a mouse or the like. For the display part 24, a Cathode Ray Tube (CRT) display, a Thin Film Transistor (TFT) liquid crystal display, a plasma display, or the like may be used.

In the verification subject apparatus 12, the packet capture part 51 described above may be formed in the same apparatus as the verification apparatus 11 as depicted in FIG. 1. Alternatively, the packet capture part 51 may be a different apparatus from the verification apparatus 11. In this case, the packet data in the packet capture part 51 may be sent to the verification apparatus 11 through the communication network 14 or the like.

<Hardware Configuration Example of Verification Apparatus 11>

By installing an execution program (a verification program) causing a computer to perform each of functions, into a general purpose PC, a server, or the like, it is possible to realize the verification process. A hardware configuration example of the computer, which realizes the verification process, will be described with reference to FIG. 2.

Figure 2:
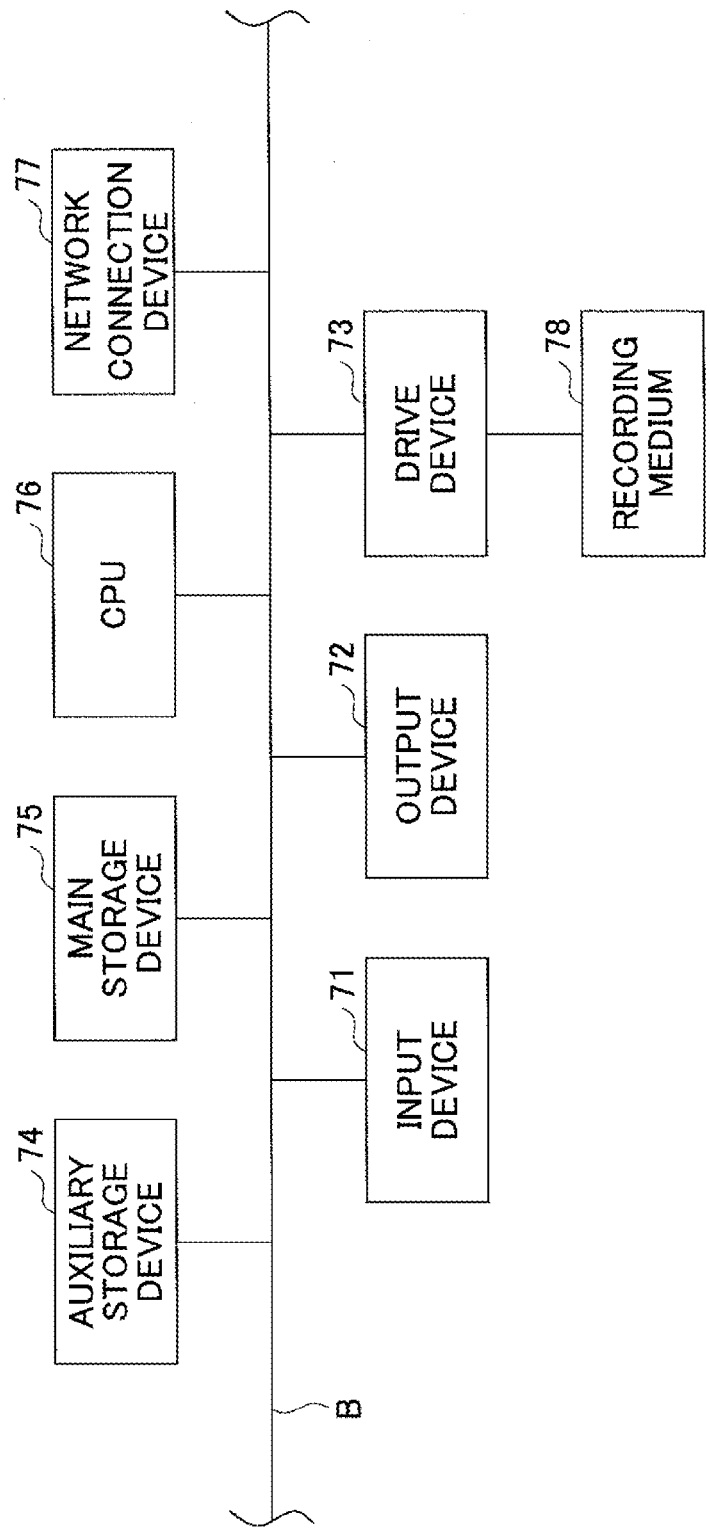
FIG. 2 is a diagram illustrating an example of a hardware configuration by which a verification process is realized.

FIG. 2 is a diagram illustrating an example of a hardware configuration by which the verification process is realized. A main body of the computer in FIG. 2 includes an input device 71, an output device 72, a drive device 73, an auxiliary storage device 74, a main storage device 75, a processor as a Central Processing Unit (CPU) 76 which conducts various controls, and a network connection device 77, which are mutually connected by a system bus B.

The input device 71 includes a keyboard, a pointing device such as a mouse for a user or the like to operate, and an audio input device such as a microphone. The input device 71 receives inputs of an execution instruction of a program, various operation information items, and the like from the user or the like.

The output device 72 includes a display which displays various windows, data, and the like which are used to operate the main body of the computer in order to carry out processes. The output device 72 is controlled by a control program which the CPU 76 possesses, to display an execution progress of the program. Also, the output device 72 prints out a process result and the like on a printing medium such as paper and presents these to the user or the like.

The execution program installed in the main body of the computer may be provided by a recording medium 78 being a portable type such as a Universal Serial Bus (USB) memory, a Compact Disc Read Only Memory (CD-ROM), a Digital Versatile Disk (DVD), or the like. The recording medium 78 may be formed by a non-transitory (or tangible) computer-readable recording medium. When the recording medium 78 storing a program is set in the drive device 73, the execution program recorded in the recording medium 78 is installed into the auxiliary storage device 74 from the recording medium 78 via the drive device 73.

The auxiliary storage device 74 is regarded as a storage unit such as a hard disk or the like. The auxiliary storage device 74 accumulates the execution program, the control program and the like which are provided with the computer, and the like, and inputs and outputs various sets of data if necessary, in response to a control signal sent from the CPU 76. The auxiliary storage device 74 may correspond to the storage part 23, and stores the above described test result, the verification packet, the actual quality characteristics, the actual packet, and the like. The auxiliary storage device 74 reads out and writes information from various information items being stored, based on the control signal or the like from the CPU 76.

The main storage device 75 stores the execution program and the like which are read out by the CPU 76 from the auxiliary storage device 74. The main storage device 75 may be, but is not limited to, a Read Only Memory (ROM), a Random an Access Memory (RAM), and the like.

The CPU 76 realizes various processes by controlling the entire computer such as an input, an output, and the like of data by associating with each of operations and each of hardware configuration parts, based on the control program such as an operating system, or the like, and the execution program stored in the main storage device 75. Various information items and the like needed during an execution of the program may be acquired from the auxiliary storage device 74. An execution result and the like are stored in the auxiliary storage device 74.

That is, the main storage device 75 may be used as a working area of the CPU 76. The verification program is operated in the main storage device 75. Specifically, the CPU 76 executes the verification program installed in the auxiliary storage device 74 based on an execution instruction and the like of the verification program, so as to perform the verification process corresponding to the verification program in the main storage device 75. The execution instruction may be acquired from the input device 71. Also, contents executed by the CPU 76 may be stored in the auxiliary storage device 74 and the like if necessary.

The network connection device 77 acquires the execution program, software, information such as the actual capture data, the verification packet data, and the like, by connecting to the communication network 14 or the like, based on the control signal sent from the CPU 76. The network connection device 77 may provide the execution result acquired by executing the verification program or the execution program itself to an external apparatus or the like. The network connection device 77 may correspond to, but is not limited to, a LAN adaptor or a modem.

By the above described hardware configuration, it is possible to perform the verification process. Also, by installing the verification program, it is possible to easily realize the verification process by using a general purpose PC or the like.

<Verification Process>

The verification process will be described by referring to flowcharts. The verification process mainly includes a quality characteristic analysis process of the actual capture and a reproduction verification process in the verification operation. These processes will be separately described below.

<Quality Characteristic Analysis Process of Actual Capture>

Figure 3:
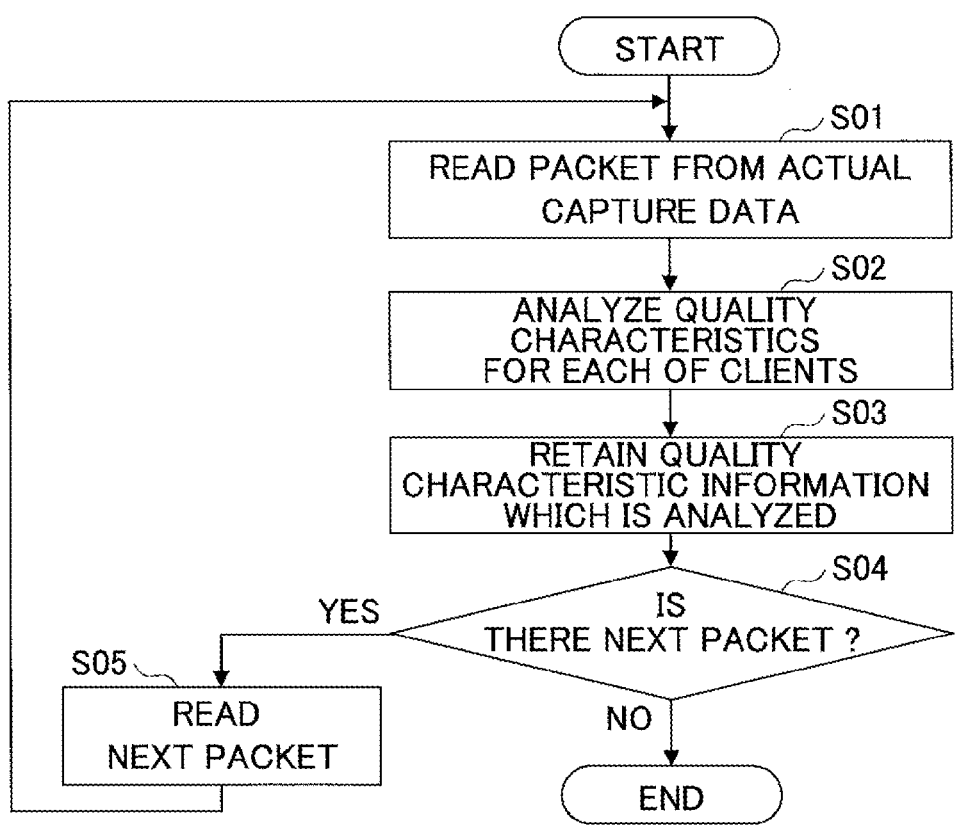
FIG. 3 is a flowchart for explaining an example of a quality characteristic analysis process using an actual capture.

FIG. 3 is a flowchart for explaining an example of the quality characteristic analysis process using the actual capture. The quality characteristic analysis process using the actual capture depicted in FIG. 3 reads out a packet from the actual capture data in order to reproduce the quality characteristics of the actual operation in the verification operation (step S01).

Next, the quality characteristic analysis process analyzes the quality characteristics on the communication or the like for each of the client terminals 13 on the basis of each IP address or the like of the client terminals 13 (step S02), and stores analyzed quality characteristic information in the storage part 23 (the actual quality characteristic storage part 62) (step S03).

Next, the quality characteristic analysis process determines whether a next packet exists for the quality characteristic analysis (step S04). If the next packet exists (YES of step S04), the quality characteristic analysis process reads out the next packet from the actual capture data (step S05), and returns to a process of step S01.

Also, if the next packet does not exist (NO of step S04), it is determined that a last packet of a process subject is processed, and the quality characteristic analysis process of the actual capture is terminated.

Next, an example of the reproduction verification process in the verification operation will be described. Specifically, the reproduction verification process is formed by a first reproduction verification process and a second reproduction verification process. In the first reproduction verification process, the actual capture is read, a request packet is sent to the verification subject apparatus 12. In the second reproduction verification process, a response packet is received from the verification subject apparatus 12, and a corresponding control signal is sent. Hence, in the following, the first reproduction verification process and the second reproduction verification process will be separately described.

Figure 4:
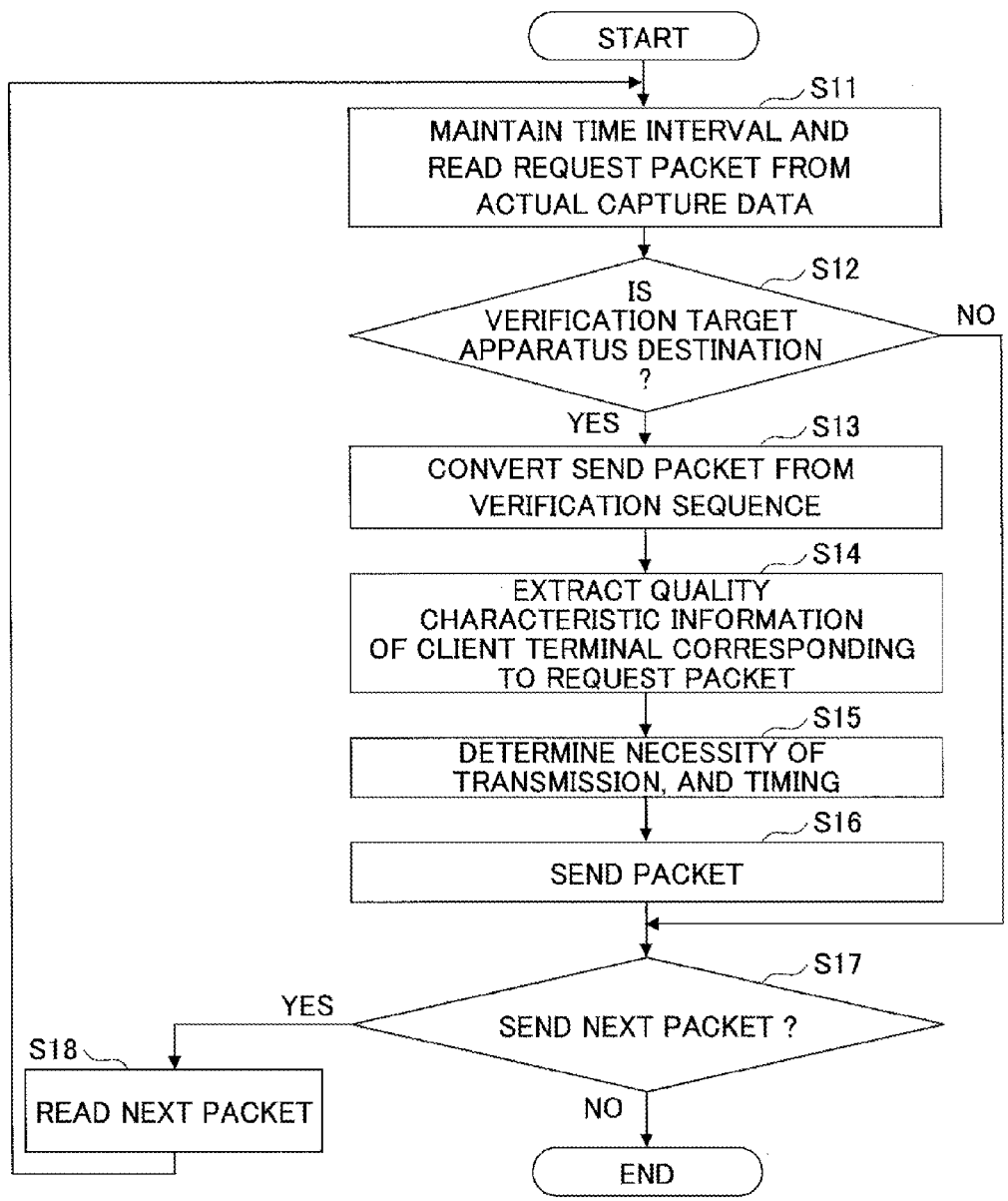
FIG. 4 is a flowchart for explaining an example of a first reproduction verification process.

FIG. 4 is a flowchart for explaining an example of the first reproduction verification process. In the first reproduction verification process depicted in FIG. 4, based on the quality characteristic information analyzed from the actual capture data, a system operation in practice is reproduced, and the request packet is read in at predetermined time intervals (step S11). That is, in the reproduction verification process in step S11, a packet is read in at the same time interval as a packet sending interval of the actual operation. The packet may be read in by synchronizing with time intervals acquired from time information included in the packet (preferably, a packet acquired time in the actual operation by the branch apparatus 15), however is not limited to this manner.

Next, in the first reproduction verification process, it is determined whether the packet being read indicates the verification subject apparatus 12 being a target as a destination (step S12). When the packet indicates the verification subject apparatus 12 as the destination (YES of step S12), the send packet is converted from the verification sequence (step S13) in the first reproduction verification process. Conversion may be performed to obtain a format capable for the verification subject apparatus 12 to respond, or to convert a portion of a header of the destination in order to send and receive packets between the verification apparatus 11 and the verification subject apparatus 12 being the destination. The conversion is not limited to these manners.

Next, in the first reproduction verification process, in order to reproduce the operation of the client terminal 13 to which the request packet is sent in the verification operation (preferably, by the verification apparatus 11), the quality characteristic information corresponding to the client terminal 13 is extracted (step S14). In the first reproduction verification process, a presence or absence of transmission for each of request packets, the timing, and the like are determined (step S15). The request packet converted based on determined contents is sent (step S16).

In the first reproduction verification process, after a process of step S16, it is determined whether a next packet is sent (step S17). In a process of step S12 in the first reproduction verification process, when the request packet being read does not indicate the verification subject apparatus 12 as the destination (NO of step S12), the request packet is not processed and it is determined whether to send the next packet (step S17).

In the first reproduction verification process, when the next packet is sent (YES of step S17), the next packet is read in by retaining the same time intervals as the packet sending intervals of the actual operation in the same manner as a process of step S11 (step S18), and returns to the process of step S11. When all packets are read or the next packet is not read in due to an end instruction or the like from the user (NO of step S17), the first reproduction verification process is terminated.

Figure 5:
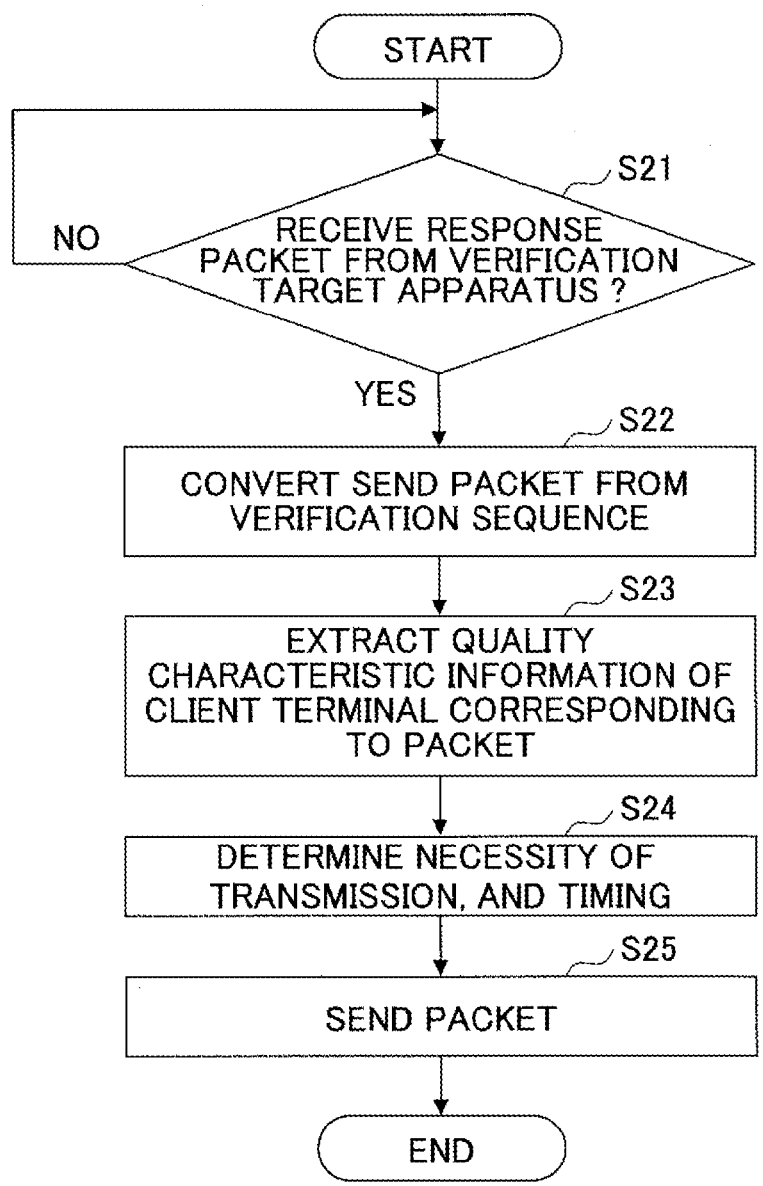
FIG. 5 is a flowchart for explaining an example of a second reproduction verification process.

FIG. 5 is a flowchart for explaining an example of the second reproduction verification process. In the second reproduction verification process depicted in FIG. 5, with respect to the request packet sent to the verification subject apparatus 12 which is set beforehand in the above described first reproduction verification process, it is determined whether the response packet is received from the verification subject apparatus 12 (step S21).

In a process of step S21 of the second reproduction verification process, when the response packet is not received (NO of step S21), a state becomes a waiting state until the response packet is received. In the process of step S21 of the second reproduction verification process, when the response packet is received (YES of step S21), the send packet (preferably, the control signal or the like) is converted from the verification sequence (one or multiple packets being previously received) (step S22). In a process of step S22, a process such as the conversion for the verification subject apparatus 12 to respond or the like is conducted in the same manner as a process of step S13, but is not limited to this manner.

Next, in the second reproduction verification process, the quality characteristic information of the client terminal 13 corresponding to the packet is extracted (step S23), and the presence or absence of the transmission (including the send method and the like), the timing, and the like are determined (step S24). In the second reproduction verification process, the packet (including the control signal and the like) converted by the above described process of step S22 is sent (step S25). The above described first reproduction verification process and second reproduction verification process may be processed in parallel by activating a receive thread for receiving the response packet from the verification subject apparatus 12.

The above described processes mainly include the quality characteristic analysis process of the actual capture and the reproduction verification process in the verification operation. In the quality characteristic analysis process of the actual capture, packets are sequentially read from the actual capture data, the quality characteristics may be analyzed for each of the clients (each of the client addresses), and the quality characteristic information being analyzed is retained. Also, in the reproduction verification process in the actual operation, when the request packet is read from the actual capture data while the time intervals are being retained and the response packet is received from the verification server, the send packet is generated from the verification sequence information. In the reproduction verification process in the verification operation, client quality characteristic information corresponding to the packet is extracted, the presence or absence of transmission and the timing are determined, and a packet transmission is conducted in accordance with the determined contents.

Schematic Example

Figure 6:
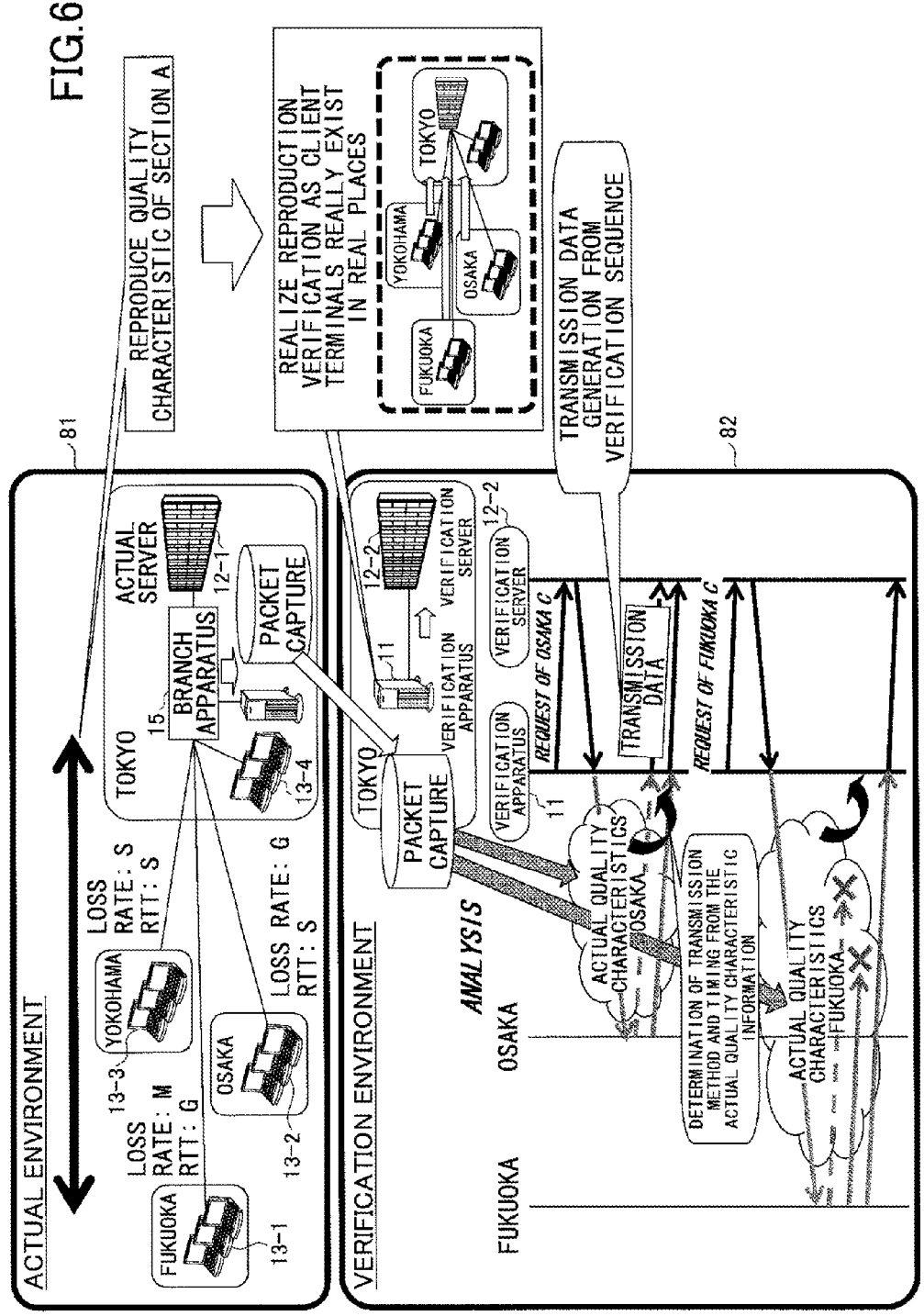
FIG. 6 is a diagram for explaining a schematic example of the verification system.

A schematic example of the verification system 10 will be described. FIG. 6 is a diagram for explaining the schematic example of the verification system 10. In the schematic example in FIG. 6, an actual environment 81 and a verification environment 82 are schematically illustrated. Also, in the schematic example in FIG. 6, as an example of the verification subject apparatus 12, the actual server 12-1 and the verification server 12-2 are included. However, the verification subject apparatus 12 is not limited to these servers 12-1 and 12-2. The actual server 12-1 and the verification server 12-2 may be integrated into one server.

The actual environment 81 depicted in FIG. 6 includes a base in each of areas: Fukuoka, Osaka, Yokohama, and Tokyo, and the entire system is formed as a data center located in Tokyo. Also, in the example in FIG. 6, one or multiple client terminals 13 are included in each of the bases. In the actual environment 81, values of the quality characteristics on the communication are different due to the loss rate, the RTT, the jitter, and the like of data being transmitted for each of the bases. In the example in FIG. 6, scales of the loss rate and the RTT as examples of the quality characteristics are represented by "G" (Great), "M" (Medium), or "S" (Small). In a case of the base of Fukuoka (the client terminal 13-1), the loss rate indicates "M" and the RTT indicates "G". In a case of the base of Osaka (the client terminal 13-2), the loss rate indicates "G" and the RTT indicates "S". In a case of the base of Yokohama (the client terminal 13-3), the loss rate indicates "S" and the RTT indicates "S". In a case of the base of Tokyo (the client terminal 13-4), since the bases include headquarters (the data center) including the actual server (the verification subject apparatus 12), the loss rate and the RTT are not indicated. As described above, in the actual environment 81, the quality characteristics and the like of the communication are varied depending on places (environments) where the client terminals 13 are arranged.

In the verification environment 82, the quality characteristics based on the predetermined condition (preferably, for each of the bases, each of the subnets, each of the connections, or each of the sequences) are analyzed from the actual capture data (preferably, the packet capture) acquired in the actual environment 81. Also, in the verification environment 82, by using the analyzed quality characteristic information and the like, the send data are generated so that the qualities are similar to those of the actual operation when the data are sent from the verification sequence to each of the bases and the like. Moreover, in the verification environment 82, as depicted in FIG. 6, the send method and the send timing are verified by using the send data in which the qualities are set to be the same as the qualities of the actual environment 81. By this configuration, the quality characteristics of the communication capture data from multiple clients (which may be Osaka C, Fukuoka C, and the like) are properly reproduced from one location where the verification apparatus 11 is arranged. Thus, the operations (the behaviors) of the verification server 12-2, the entire system, and the like are properly verified by using reproduced data.

First Embodiment

Figure 7:
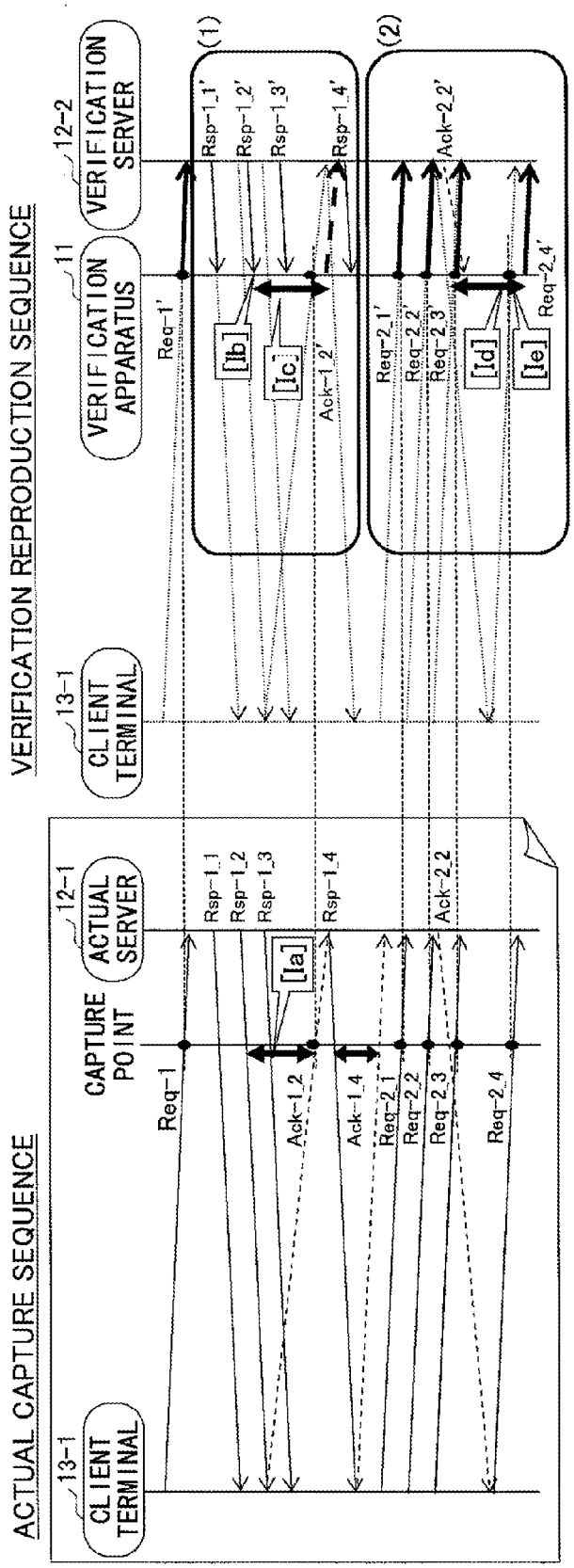
FIG. 7 is a diagram for explaining a verification reproduction sequence in a first embodiment.

Next, a detailed example of a verification reproduction sequence in the above described verification system 10 will be described. FIG. 7 is a diagram for explaining the verification reproduction sequence in a first embodiment. The verification reproduction sequence corresponds to a sequence of exchanging messages in a case of verifying a reproduction operation based on the actual capture data in the same manner as the above described verification sequence.

In the first embodiment, as the quality characteristics to be reproduced, an example for reproducing and verifying the RTT of the actual environment as the verification operation will be illustrated. Also, in the example in FIG. 7, for the sake of convenience, a communication sequence between one client (the client terminal 13-1) and the verification subject apparatuses 12 (the actual server 12-1 and the verification server 12-2) is used for the explanation below. In a case of multiple clients, the similar process is repeated multiple times.

A left side in FIG. 7 illustrates an example for analyzing an RTT quality from an actual capture sequence. In the first embodiment, first, the RTT quality is analyzed for each of the client terminals 13, and the analysis result is retained. In the first embodiment, request data (Req) is sent from the client terminal 13-1 to the actual server 12-1, and response data (Rsp) is sent from the actual server 12-1 to the client terminal 13-1. Also, the client terminal 13-1 and the actual server 12-1 send positive responses (Ack) with respect to the request data and the response data which are normally received.

In the first embodiment, the RTT is defined for an interval from a received time of the response data, which is acquired at a capture point where the above described branch apparatus 15 is arranged, to a received time of the positive response (Ack). Specifically, in the example in FIG. 7, the RTT is defined for "time from a received time of a Rsp-1_2 packet to a received time of a Ack-1_2 packet", "time from a received time of a Rsp-1_4 packet to a received time of a Ack-1_4 packet", and the like. Moreover, in the first embodiment, an average is calculated for multiple RTTs being acquired [Ia]. Hereinafter, this average is called "RTT_a". The RTT in the first embodiment is not limited to the above described contents, and the RTT may be determined for a time interval between Syn-Ack and Ack when a TCP_3Way handshake is conducted.

Also, a right side in FIG. 7 illustrates an example for reproducing a verification RTT by using an actual RTT acquired by the above described process (an example of a verification reproduction sequence). In a case in which the actual RTT is reproduced as the quality, the verification apparatus 11 is needed to process as if the communication packet reaches the client terminal 13-1 through an actual communication section. Moreover, the verification apparatus 11 is needed to process as if the communication packet to send to the verification server 12-2 reaches through an actual communication section from the client terminal 13-1. Hence, the verification apparatus 11 may conduct a process for sending the communication packet with a delay for the RTT corresponding to the communication section or a process for determining by using information (Ack) traced back for the RTT whether a packet transmission is permitted.

The packet transmission from the verification apparatus 11 mainly includes an Ack transmission process when the response packet is received ((1) in FIG. 7), and a data transmission process in accordance with the time interval of the actual capture ((2) in FIG. 7). In the following, each of the processes will be described.

Figure 8:
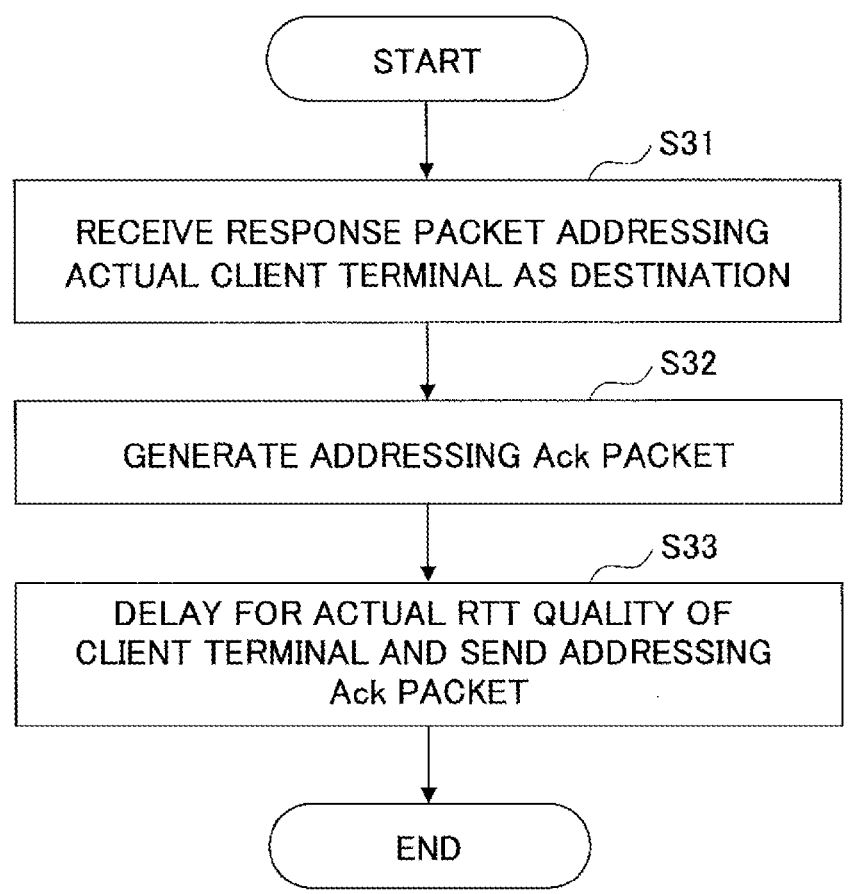
FIG. 8 is a flowchart for explaining an example of an Ack transmission process in the first embodiment.

FIG. 8 is a flowchart for explaining an example of the Ack transmission process in the first embodiment. An example in FIG. 8 corresponds to a process of (1) in FIG. 7. In the Ack transmission process, the response packet (preferably, Rsp-1_2'), which corresponds to the client terminal 13-1 of the destination in the actual operation, is received in the verification sequence (step S31). Next, in the Ack transmission process, a corresponding Ack (positive response) packet (preferably, Ack-1_2') is generated based on the verification sequence with receiving the response packet as a trigger (step S32). Step S32 corresponds to [Ib] in FIG. 7. The Ack packet to be generated may be generated in accordance with a TCP sequence number of the verification operation or the like.

Next, in the Ack transmission process, instead of immediately sending the Ack packet generated by a process of step S32 to the verification server 12-2, the Ack packet is sent the verification server 12-2 at timing so as to delay for the actual RTT quality (preferably, the RTT_a) of the client terminal 13-1 from timing of receiving the response packet (preferably, Res-1_2') in the verification sequence (step S33). A process of step S33 corresponds to [Ic] in FIG. 7. That is, in the verification sequence, with respect to each of response packet received times, a sending time of the Ack packet, which is generated by adding time of the actual RTT quality, is determined, and the Ack packet is sent in accordance with the determined sending time. By this operation, in the first embodiment, it is possible to send the Ack packet (Ack-1_2') at timing corresponding to the actual RTT.

Figure 9:
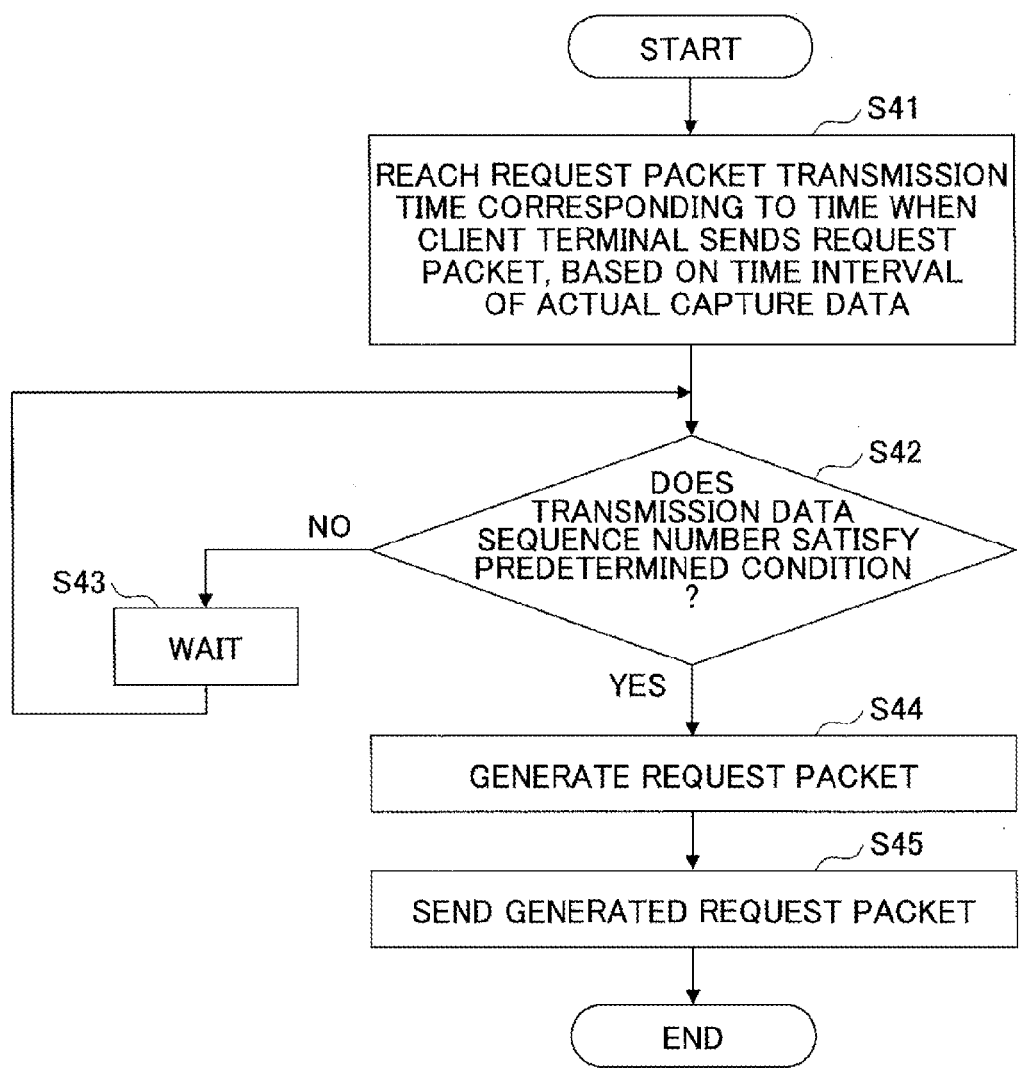
FIG. 9 is a flowchart for explaining an example of a data sending process in the first embodiment.

FIG. 9 is a flowchart for explaining an example of a data sending process in the first embodiment. The example in FIG. 9 corresponds to a process of (2) in FIG. 7. In the data sending process, when time reaches a sending time of the request packet sent by the client terminal 13-1 which corresponds to the time interval of the actual capture data in the verification sequence (step S41), it is determined whether a send data sequence number satisfies a predetermined condition (step S42).

As the predetermined condition, preferably, an Ack sequence number at a time traced back for the RTT_a, which indicates the actual RTT quality of the client terminal 13-1 from a current time, a TCP_Window size, and the like may be used. However, the predetermined condition is not limited to these items. In a process of step S42, preferably, the Ack sequence number, which was received until time traced back for the RTT_a from the above described current time (current time−(RTT_a)), and the TCP_Window size are added. Then, when the added value is greater than the send data sequence number at the current time, it is determined that the send data sequence number satisfies the predetermined condition. A predetermined value (preferably, for 3 packets (only 3 packets are permitted to be sent without waiting for Ack)) may be set for the TCP_Window size. However, the TCP_Window size is not limited to the predetermined value for 3 packets.

In the data sending process, when the send data sequence number does not satisfy the predetermined condition (NO of step S42), a given time is waited for (step S43), and the process of step S42 is repeated. In the first embodiment, by waiting for the given time, the Ack packet may be received in the given time, and the Ack sequence number is increased in response to receiving of the Ack packet. Hence, the predetermined condition may be satisfied due to time lapse.

Moreover, in the data sending process, when the send data sequence number satisfies the predetermined condition (YES of step S42), a corresponding request packet is generated based on the verification sequence (step S44), and a generated request packet is sent (step S45).

That is, in the verification sequence, for the send timing of predetermined data, it is determined whether to permit sending of predetermined data with respect to Ack which is specified by tracing back for the RTT from the current timing. When a predetermined sending condition is satisfied, the predetermined data are sent. In other words, in the verification sequence, as for time for determining whether to permit transmission for each of the request packets, it is determined whether to permit the transmission based on Ack at time when a time of the actual RTT quality is deducted, and a process for delaying the transmission until the predetermined sending condition is satisfied. In the example of (2) in FIG. 7, in accordance with the time interval of the actual capture, after multiple request packets Req-2_1' through Req-2_3' are sent as the verification sequence, a request packet Req-2_4' is sent. It is determined whether the request packet Req-2_4' is permitted to be sent based on the Ack sequence number at time traced back for the RTT_a, which indicates the actual RTT quality of the client terminal 13-1, from the timing when the transmission permission is determined.

The Window size indicates 3 packets in the example in FIG. 7. In the verification sequence, the Ack packet (Ack-2_2') of the verification server 12-2 is delayed a bit more than the actual Ack packet (Ack-2_2'). Accordingly, in a case of applying timing based on the same time interval as an actual time interval, the Ack packet (Ack-2_2') has not arrived at the time traced back for the RTT_a. Thus, it is not possible to send the request packet.

In the embodiment, as a result, at timing in which the RTT_a alone is delayed from the received time of the Ack packet (Ack-2_2'), the request packet Req-2_4' is generated in accordance with an actual TCP sequence number from information of the verification sequence ([Id] in FIG. 7). Then, the generated request packet Req-2_4' is sent ([Ie] in FIG. 7). By this operation, it is possible to reproduce the quality characteristics similar to the actual operation in the verification operation. Moreover, it is possible to send data at an appropriate timing in the verification operation.

Second Embodiment

Figure 10:
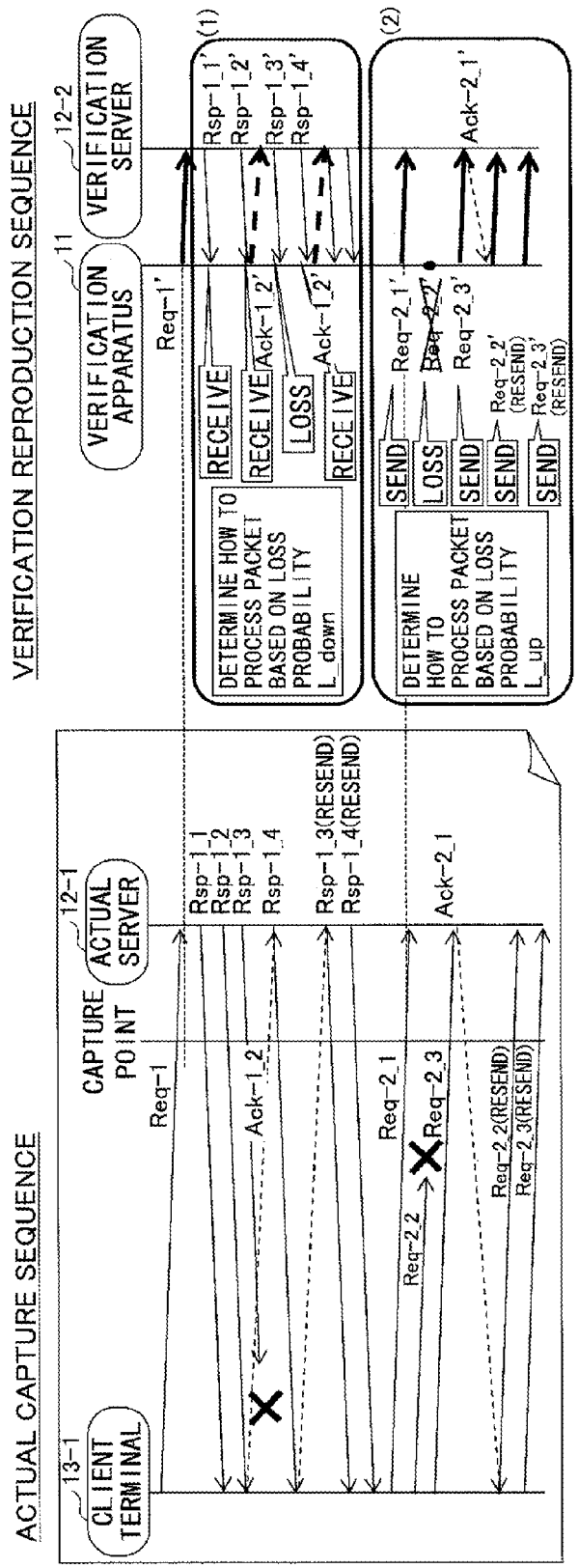
FIG. 10 is a diagram for explaining the verification reproduction sequence in a second embodiment.

Next, a second embodiment will be described. FIG. 10 is a diagram for explaining the verification reproduction sequence in the second embodiment. In the second embodiment, the data loss (which may be a packet loss) on the communication is reproduced and analyzed as the quality characteristics to reproduce. Also, in an example in FIG. 10, for the sake of convenience, a communication sequence between one client (the client terminal 13-1) and the verification subject apparatuses 12 (the actual server 12-1 and the verification server 12-2) is used. In a case of multiple clients, a similar process is repeated multiple times.

A left side in FIG. 10 indicates an example of analyzing the loss quality (the loss rate) from a sequence of the actual capture data. In the second embodiment, first, the loss quality (the loss rate) is analyzed for each of the client terminals 13, and an analysis result is retained.

A loss analysis may acquire a location or the like where the loss occurs, by detecting a TCP sequence number omission, a duplicate Ack, a resend packet, and the like from the actual capture data acquired at a capture point. The loss analysis is not limited to this analysis method. Moreover, a loss number may be analyzed and retained for each of directions (an up direction and a down direction) for each of the client terminals 13. The loss rate may be calculated by dividing a retained loss number by a final total packet number. However, calculation of the loss rate is not limited to this method. Furthermore, instead of calculating for each of the directions (the up direction and the down direction), the calculation may be conducted in common for both directions (in common for the up direction and the down direction). In this case, the same value is used for the loss rates in the up direction and the down direction.

By this operation, in the second embodiment, it is possible to retain a loss rate L_up in the up direction (C (the client terminal 13-1)→S (actual server 12-1)) and a loss rate L_down in the down direction (S→C).

Next, in the second embodiment, the quality characteristic in the verification operation is reproduced by using the quality characteristic of an acquired loss rate in the actual operation. Verifications of operations of the verification server 12-2 and the entire system are conducted. A right side in FIG. 10 indicates the verification reproduction sequence. In a case of reproducing the actual loss rate as the quality, it is determined whether a packet is sent as if a packet loss occurs between the client terminal 13-1 and the capture point, or the packet is not sent (assumed the packet loss occurs) for each of the directions. The packet loss is simulated and reproduced.

The packet loss reproduction process in the verification apparatus 11 mainly includes a quasi-loss reproduction process of the down direction (S→C) depicted in (1) in FIG. 10, and a quasi-loss reproduction process of the up direction (C→S) depicted in (2) in FIG. 10. In the following, each of the processes will be described.

Figure 11:
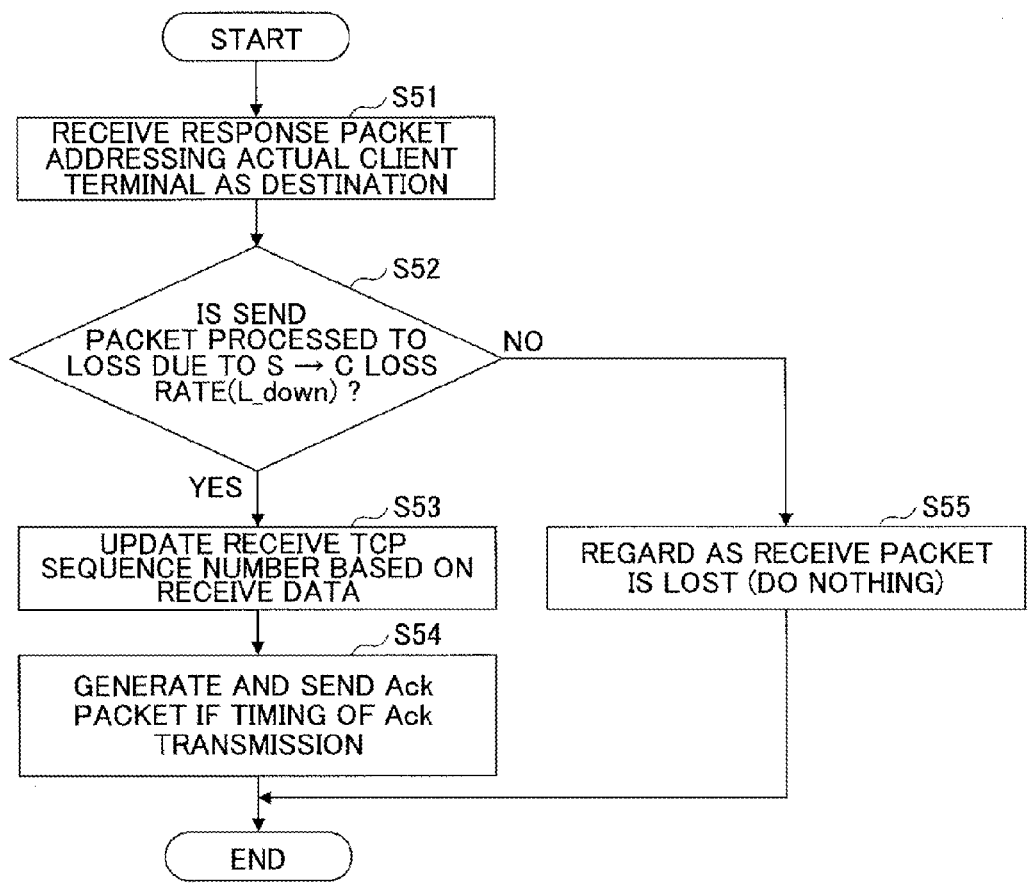
FIG. 11 is a flowchart for explaining an example of a packet loss reproduction process in a down direction in the second embodiment.

FIG. 11 is a flowchart for explaining an example of the packet loss reproduction process in the down direction in the second embodiment. In the packet loss reproduction process in the down direction depicted in FIG. 11, the response packet, which corresponds to the client terminal 13-1 as the destination in the actual operation, is received in the verification sequence (step S51). Also, in the packet loss reproduction process in the down direction, it is determined whether the received packet is handled as the loss packet at probability of a S→C loss rate (L_down) (step S52). In the packet loss reproduction process in the down direction, when the received packet is not handled as the loss packet (NO of step S52), a receive TCP sequence number is updated based on the received data (step S53). In the packet loss reproduction process in the down direction, if it is timing of sending Ack, a corresponding Ack packet is generated and sent (step S54).

Also, in the packet loss reproduction process in the down direction, when the received packet is handled as the loss packet (YES of step S52), the received packet is regarded as lost, and nothing is processed (step S55).

That is, in a process in FIG. 11, the verification apparatus 11 determines whether to send Ack based on the probability of actual loss rate in the down direction when receiving the response packet from the verification server 12-2. Moreover, the verification apparatus 11 generates and sends the Ack packet corresponding to a determination to the verification server 12-2.

In (1) in FIG. 10, the verification apparatus 11 receives response packets Rsp-1_1', Rsp-1_2', Rsp-1_3', and Rsp-1_4'. The verification apparatus 11 determines that response packets Rsp-1_1' and Rsp-1_2' are normally received with a probability of the S→C loss rate (L_down) at timing when each of the response packets is received. The verification apparatus 11 determines that the response packet Rsp-1_3' is handled as the loss packet. In the second embodiment, the verification apparatus 11 generates the Ack (positive response) packet Ack-1_2', which is sent when the response packet Res-1_3' is lost, as the verification apparatus 11 determines that response packet Rsp-1-4' is normally received. The Ack packet Ack-1_2' may include a control message indicating a receive completion until the response packet Rsp-1_2'. The verification apparatus 11 sends a generated Ack packet (Ack-1_2') to the verification server 12-2.

Figure 12:
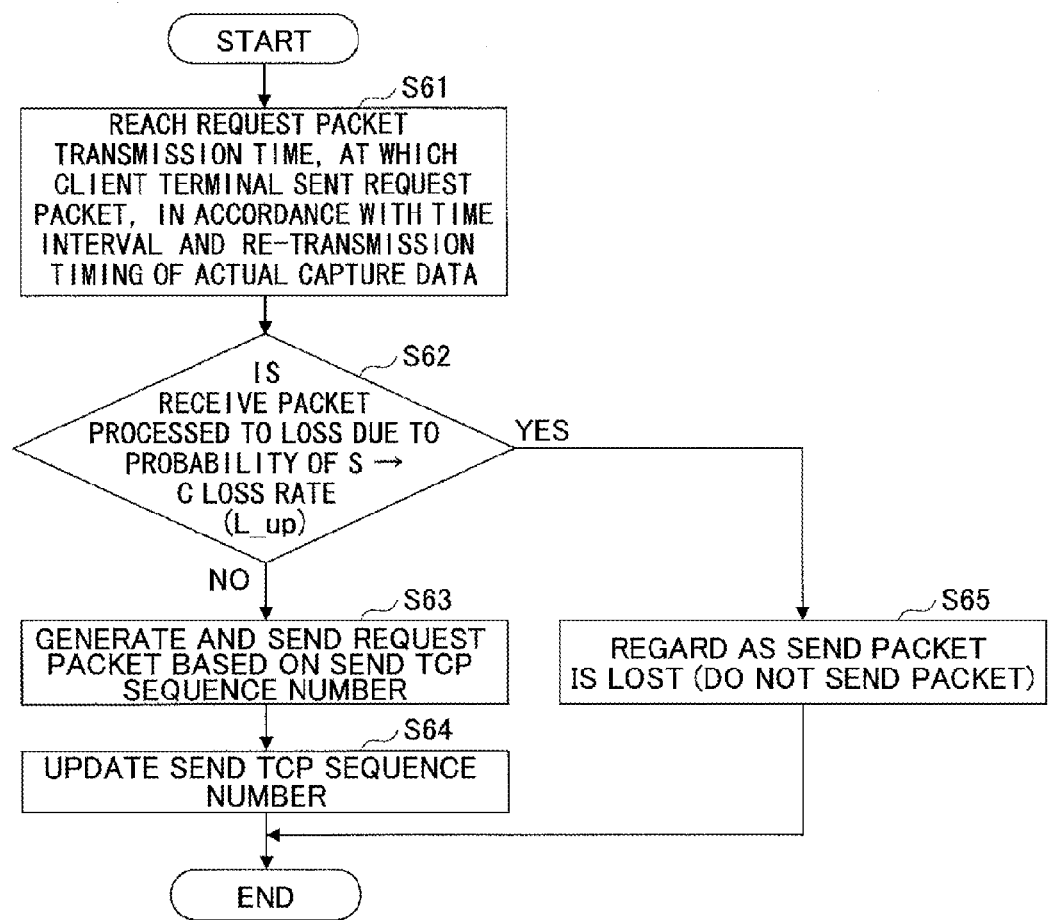
FIG. 12 is a flowchart for explaining an example of the packet loss reproduction process in an up direction in the second embodiment.

FIG. 12 is a flowchart for explaining an example of the packet loss reproduction process in the up direction in the second embodiment. In the packet loss reproduction process in the up direction depicted in FIG. 12, the time reaches the sending time of the request packet which the client terminal 13-1 sent in accordance with the time interval of the actual capture data or resend timing, in the verification sequence (step S61). In the packet loss reproduction process, at the sending time, it is determined whether the send packet is handled as the loss packet with the probability of the C→S loss rate (L_up) (step S62). In the packet loss reproduction process in the up direction, when the send packet is not handled as the loss packet (NO of step S62), the request packet is generated and sent based on the send TCP sequence number (step S63). The send TCP sequence number is updated (step S64).

Also, in the packet loss reproduction process in the up direction, when the send packet is handled as the loss packet (YES of step S62), the send packet is regarded as lost and is not sent (step S65).

That is, in the packet loss reproduction process in the up direction in FIG. 12, the verification apparatus 11 determines whether to send the request packet based on the probability of the actual loss rate in the up direction with respect to the verification server 12-2. The verification apparatus 11 generates and sends the request packet corresponding to this determination to the verification server 12-2.

In (2) in FIG. 10, the actual capture sequence includes the request packets Req-2_1', Req-2_2', and Req-2_3'. The verification apparatus 11 generates and sends data as the request packet Req-2_1' is sent with the probability of the C→S loss rate (L_up) at timing of sending the request packet Req-2_1' in the verification sequence. At timing of sending the request packet Req-2_2', the verification apparatus 11 determines that the request package Req-2_2' is handled as the loss packet, and does not generate and send data. Furthermore, at timing of sending the request packet Req-2_3, the verification apparatus 11 generates and sends data as a succeeding request packet Req-2_3' is handled to send. After that, the verification apparatus 11 receives the response packet Ack-2_1' sent from the verification server 12-2 which reports that the request packet Req-2_2' is not received. After receiving the report, the verification apparatus 11 determines, by a probability process similar to that in the above described verification reproduction sequence, that the request packets Req-2_2' and Req-2_3' to resend are sent, and generates data for these packets. Also, the verification apparatus 11 sends generated request packets Req-2_2' and Req-2_3' to resend, to the verification server 12-2.

In the above described first embodiment and second embodiment, cases of the RTT and the loss rate as reproduction qualities are separately described. A case of both the RTT and the loss rate as the reproduction qualities correspond to the reproduction sequence in which the above described first embodiment and second embodiment are combined.

Third Embodiment

Figure 13:
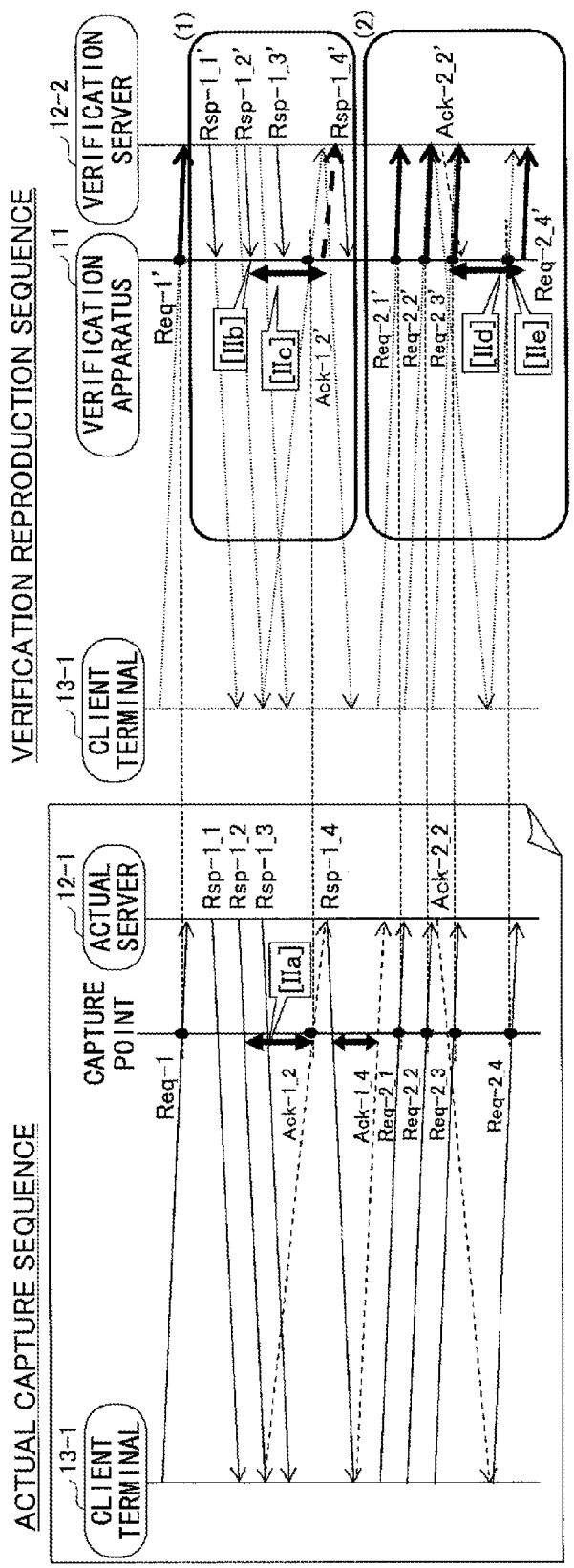
FIG. 13 is a diagram for explaining a verification reproduction sequence in a third embodiment.

Next, a third embodiment will be described. FIG. 13 is a diagram for explaining a verification reproduction sequence in the third embodiment. In the third embodiment, an example, in which a jitter (fluctuation) is reproduced and analyzed as the reproduction quality, will be described. Also, in an example in FIG. 13, for the sake of convenience, the communication sequence between one client (the client terminal 13-1) and the verification subject apparatus (the actual server 12-1 and the verification server 12-2) is used for an explanation below. In a case of the multiple clients, a similar process is repeated multiple times.

In the third embodiment, the jitter is interpreted as fluctuation of the RTT, and an example of considering the fluctuation for the RTT (the average RTT_a or the like) in the first embodiment will be described. Hence, in the third embodiment, first, an example of analyzing the RTT quality from actual capture data will be described.

A left side in FIG. 13 indicates a sequence of the actual capture data similar to that at the left side in FIG. 7. In the third embodiment, first, the RTT quality is analyzed for each of the client terminals 13, and an analysis result is maintained.

In the third embodiment, as described above, preferably, time from a received time of the Rsp-1_2 packet to a received time of the Ack-1_2 packet, or time from a received time of the Rsp-1_4 packet to a received time of the Ack-1_4 packet is applied to the RTT. Also, in the third embodiment, an average (the RTT_a) and a standard deviation (hereinafter, this standard deviation is called "σ_a") are acquired. An example of the RTT in the third embodiment is not limited to the above described contents. Preferably, the time interval between Syn-Ack and Ack when the TCP_3Way handshake is conducted may be used as the RTT.

A right side in FIG. 13 indicates an example of reproducing the RTT and the fluctuation in the verification operation by using the RTT and the fluctuation (jitter) in the actual operation which are acquired by the above described process.

A basic process operation is similar to that using the RTT in the first embodiment. Differently, a value (hereinafter, called "RTT_a_σ"), which is calculated based on a statistical probability derived from the average RTT_a and the standard deviation σ_a, is used as a reference value ([IIa] in FIG. 13). In the third embodiment, by using a normal distribution "$f(x)=1/\sqrt{(2\pi)}\sigma)\exp\{-(x-\mu)^2/(2\sigma^2)\}$" of an average $\mu$ and the standard deviation $\sigma$, the RTT_a_σ is acquired by calculating a normal random value in accordance with a case where $\mu$=RTT_a and $\sigma$=σ_a. In the third embodiment, the quality characteristics in the verification operation are reproduced by using a calculated RTT_a_σ.

In the third embodiment, packet transmissions by the verification apparatus 11 are mainly classified into the Ack transmission process depicted by (1) in FIG. 13 and the data transmission process depicted by (2) in FIG. 13, similar to the first embodiment. In each of the processes, instead of the RTT_a, the above described RTT_a_σ is used. In the following, each of the processes will be described.

Figure 14:
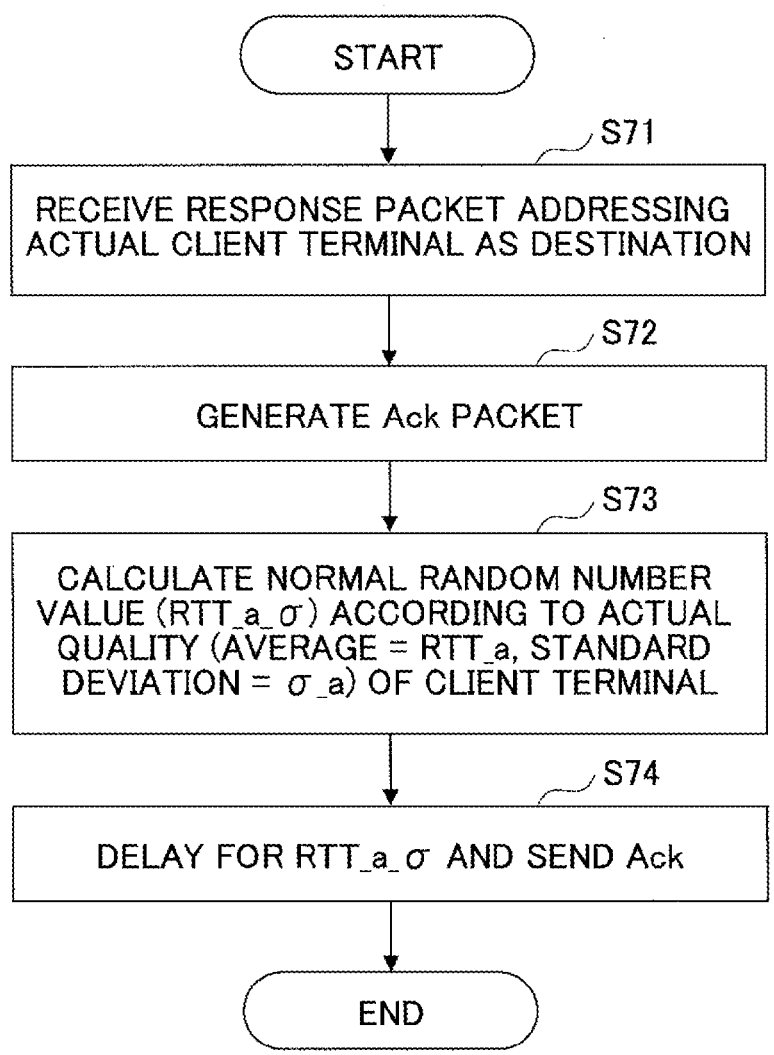
FIG. 14 is a flowchart for explaining an example of an Ack transmission process in the third embodiment.

FIG. 14 is a flowchart for explaining an example of the Ack transmission process in the third embodiment. An example in FIG. 14 corresponds to the process of (1) in FIG. 13. In the Ack transmission process, the response packet (preferably, Rsp-1_2') corresponding to the client terminal 13-1 in the actual operation as the destination is received in the verification sequence (step S71). Next, in the Ack transmission process, a corresponding Ack packet (preferably, Ack-1_2') is generated based on the verification sequence with receiving the response packet as a trigger (step S72). This generation corresponds to [IIb] in FIG. 13. The Ack packet is generated in accordance with the TCP sequence number or the like in the verification operation.

Next, in the Ack transmission process, the normal random value (RTT_a_σ) is calculated in accordance with the actual RTT quality of the client terminal 13-1 (the average=RTT_a and the standard deviation=σ_a) (step S73). After that, in the Ack transmission process, the Ack packet is sent to the verification server 12-2 by delaying for the actual RTT quality (preferably, RTT_a_σ) of the client terminal 13-1 (step S74). By this operation, in the third embodiment, it is possible to send the Ack packet (Ack-1_2') at timing corresponding to the actual RTT.

Figure 15:
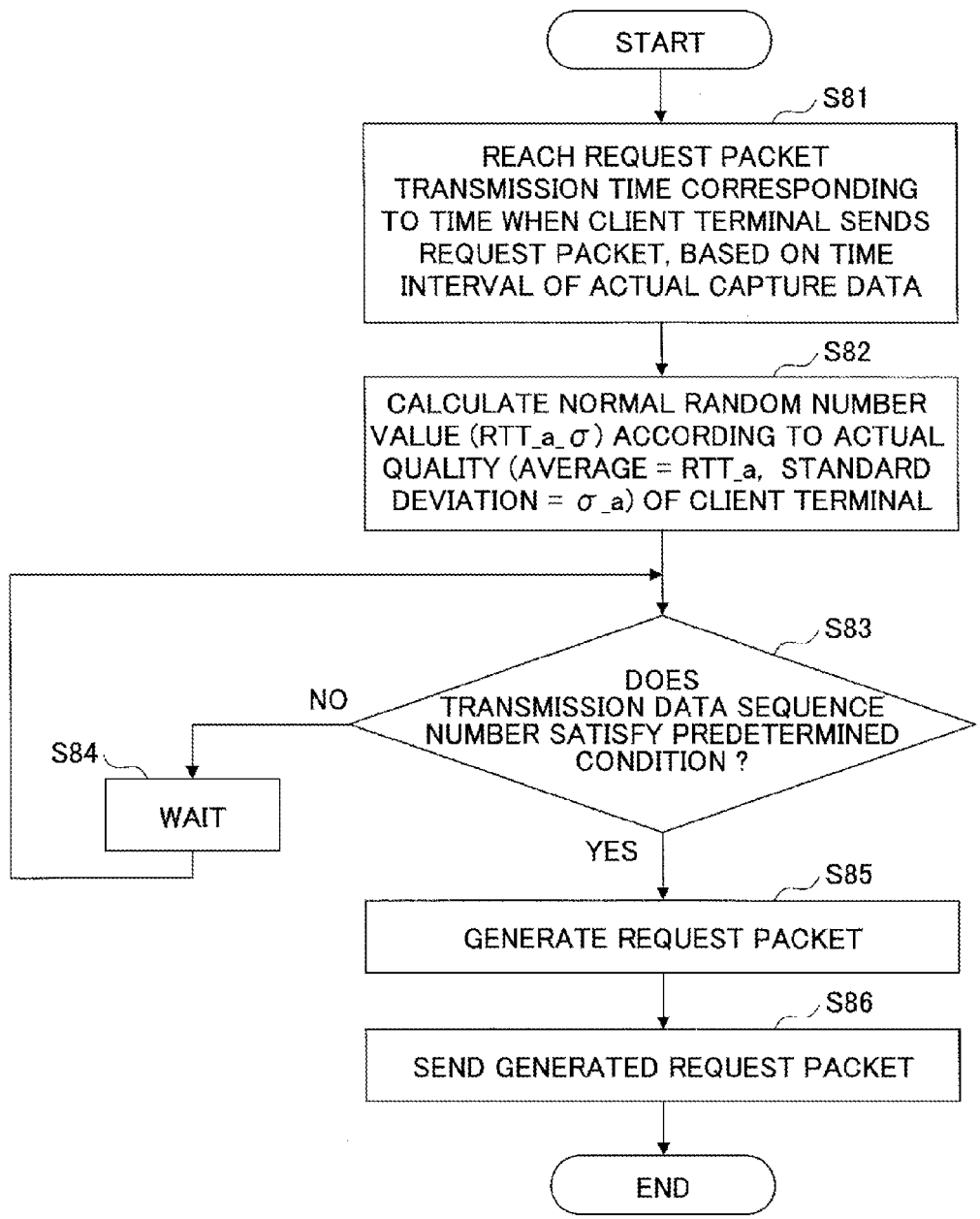
FIG. 15 is a flowchart for explaining an example of a data transmission process in the third embodiment.

Also, FIG. 15 is a flowchart for explaining an example of the data transmission process in the third embodiment. An example in FIG. 15 corresponds to a process of (2) in FIG. 13. In the data transmission process, when the time reaches the sending time of the request packet which the client terminal 13-1 sends corresponding to the time interval of the actual capture data in the verification sequence (step S81), the normal random value (RTT_a_σ) is calculated in accordance with the actual RTT quality of the client terminal 13-1 (the average=RTT_a and the standard deviation=σ_a) (step S82). This calculation corresponds to [IIc] in FIG. 13. After that, in the data transmission process, it is determined whether the send data sequence number satisfies the predetermined condition (step S83).

The Ack sequence number at time traced back for RTT_a_σ which is actual RTT quality of the client terminal 13-1 from the current time similar to the above described first embodiment, the TCP_Window size, and the like may be used for the predetermined condition. The predetermined condition is not limited to these. In a process of step S83, preferably, the Ack sequence number, which received until time traced back for the RTT_a_σ from the current time (current time−(RTT_a_σ)), and the TCP_Window size are added. If an added value is greater than the send data sequence number at the current time, it is determined that the send data sequence number satisfies the predetermined condition. TCP_Window size may be set as a predetermined value (preferably, for 3 packets). However, the predetermined value is not limited to 3 packets.

In the data transmission process, when the send data sequence number does not satisfy the predetermined condition (NO of step S83), a given time is waited for (step S84) and the process of step S83 is repeated. In the third embodiment, by waiting for the given time, the Ack packet may be received in the given time, and the Ack sequence number is increased in response to receiving of the Ack packet. Hence, the predetermined condition may be satisfied due to time lapse.

Also, in the data transmission process, when the send data sequence number does not satisfy the predetermined condition (YES of step S83), a corresponding request packet is generated based on the verification request packet (step S85), and a generated request packet is sent (step S86).

That is, at send timing of the predetermined data in the third embodiment, it is determined whether to permit sending the predetermined data, with respect to Ack which is specified by tracing back based on the normal random value (RTT_a_σ) in accordance with the actual RTT quality (the average=RTT_a and the standard deviation=σ_a). When the predetermined sending condition is satisfied, the predetermined data are sent. In an example of (2) in FIG. 13, in accordance with the time interval of the actual capture, the request packet Req-2_4' is sent after the multiple request packets Req-2_1' through Req-2_3' are sent as the verification sequence. These operations correspond to [IId] and [IIe] in FIG. 13. It is determined whether to permit sending the request packet Req-2_4', based on the Ack sequence number which is acquired by tracing back only for RTT_a_σ being the actual RTT quality of the client terminal 13-1 from a send permission determination timing.

Similar to the first embodiment, in example in FIG. 13, the Window size corresponds to 3 packets. In the verification sequence, the Ack packet (Ack-2_2') of the verification server 12-2 is delayed a bit more than the actual Ack packet (Ack-2_2'). At timing of the same time interval as the actual operation, since the Ack packet (Ack-2_2') has not arrived at time traced back for the RTT_a_σ, the predetermined data are not sent.

In the embodiment, at timing which is delayed for the RTT_a_σ from a received time of the Ack packet (Ack-2_2') in the event, the request Req-2_4' is generated in accordance with the TCP sequence number based on information of the verification sequence, and is sent. By this operation, in the verification operation, it is possible to reproduce the quality characteristics similar to the actual operation. Furthermore, it is possible to send data at an appropriate timing in the verification operation.

In the embodiments, as described in the first to third embodiments for each of the quality analysis subjects, the quality characteristics are reproduced by combining two or more of the quality characteristics such as the RTT, the packet loss, the jitter (fluctuation), and the like. Thus, it is possible to appropriately verify operations of the servers and the entire system with reproduced contents.

<Each Example of Various Data>

Each example of various data will be described. FIG. 16 is a diagram illustrating an example of the actual capture data. Items of the actual capture data illustrated in FIG. 16 preferably include but are not limited to a sequence (packet) number "NO.", a "packet acquired time", "packet information", and the like. Also, the "packet information" may include but is not limited to include an "initiator address", a "destination address", an "initiator port number", a "destination port number", "payload information", and the like. The actual capture data are stored in the actual packet storage part 61 in an order of sending data indicating the "packet acquired time", "packet information", and the like described above.

Capture data, in which the sequence (packet) number is first, store the packet acquired time "13:00:00.000000", the initiator address "10.2.1.100", the destination address "10.1.1.1", the initiator port number "10001", the destination port number "80", and the payload information "Syn". The payload information is regarded as information included in a signal.

That is, in an example in FIG. 16, the packet information acquired at the branch apparatus (a capture point) is stored with the packet acquired time as the capture data. Basically, the entirety of information included in the packet is stored. Preferably, needed information alone may be extracted and stored by using a free tool or the like such as Wireshark (tshark), tcpdump, or the like.

FIG. 17 is a diagram illustrating an example of the actual quality characteristic information. Preferably, the actual quality characteristic information is stored in the actual quality characteristic storage part 62. The actual quality characteristic information may include items of a "client address" for identifying each of the client terminals 13-1 through 13-n and communicating with a predetermined client terminal 13, and the like. Also, the actual quality characteristic information may include but is not limited to items of an "actual RTT quality (msec)", an "actual loss quality (loss rate up/down) (%)", an "actual jitter quality (standard deviation) (msec)", and the like, which are set for each of the client terminals 13.

In an example in FIG. 17, preferably, a client address "C1", the actual RTT quality "10 (msec)", the actual loss quality (loss rate up/down) "1.0/1.5(%)", and the actual jitter quality (the standard deviation) "2.0 (msec)" are stored. The client address may be information such as an IP address or the like to uniquely specify the client terminal 13. Each set of the quality characteristic information is analyzed by the actual quality analysis part 31.

In an example depicted in FIG. 17, the quality characteristic information is stored for each of the client addresses. The quality analysis subject is not limited to this, and may be each of the bases, each of the subnets (the subnet addresses), each of the connections, each of the sequences, and the like. Also, the quality analysis subject may be the quality characteristic information formed by combining multiple items of each of the bases, each of the subnets (the subnet addresses), each of the connections of the client terminal 13, and each of the sequences. As the quality analysis timing in the above described verification apparatus 11, after all actual capture data for one day, one week, or one month may be read and analyzed beforehand, and the quality characteristic information may be stored in the actual quality characteristic storage part 62, the verification process may be conducted. Also, the verification apparatus 11 may carry out data transmission in which the quality is reproduced by using the quality analysis result, in parallel with acquiring the actual capture and analyzing the quality, so as to perform the verification process at real time. By these operations, it is possible to reproduce the verification environment closer the actual environment, and to realize a more proper verification.

FIG. 18 is a diagram illustrating an example of base management information. The base management information depicted in FIG. 18 may include but is not limited to items of a "base name", a "base address", and the like. The base management information is used in a case of analyzing the quality characteristics for each of the bases where the client terminals 13 are in the actual quality analysis part 31 of the verification apparatus 11. In an example in FIG. 18, by corresponding to the base name, an address belonging to the base is maintained by an "address" and an "integration mask length". However, a management method of the address belonging to the base is not limited to this manner. Alternatively, multiple subnets belonging to the base may be maintained by a list. The base management information may be maintained by the actual quality analysis part 31, and may be stored in the storage part 23.

FIG. 19 is a diagram illustrating an example of subnet management information. The subnet management information depicted in FIG. 19 may include but is not limited to include items of a "subnet name", a "subnet address", a "subnet mask length", and the like.

In the actual quality analysis part 31, the base management information or the like, in which the subnet name and the address correspond to each other as depicted in FIG. 19, may be used in a case of analyzing the quality characteristics for each of the subnets (preferably, each of sections) of a base (which may be Tokyo). In an example in FIG. 19, for each of the subnet names on the base of the sections, the address belonging to the section is managed by the subnet address and the subnet mask length. However, the management method is not limited to this manner. By the above described base management information, a default may be defined for the subnet mask length, and only the subnets other than the default may be maintained. Also, in a case in which the base management information depicted in FIG. 18 is maintained by a subnet unit, it is possible to integrate and maintain the base management information depicted in FIG. 18 and the subnet management information depicted in FIG. 19 at one place. The subnet management information may be maintained by the actual quality analysis part 31, and may be stored in the storage part 23.

<Specific Example in Case of Aggregating and Analyzing Quality Characteristics Based on Predetermined Condition>

The actual quality analysis may be performed for each of the bases, for each of the subnets (the subnet addresses), for each of the connections, and for each of the sequences, as well as for each of the client terminals as described before. In the following, a specific example of integrating and analyzing the quality characteristics based on the predetermined condition.

Areas may be divided preferably based on the bases of Tokyo, Osaka, Fukuoka, and the like, and the base address for each of the bases or the subnet addresses where the client terminals are arranged may be applied to divided areas.

<Integration Subject of Quality Characteristics>

In a case in which the quality characteristics are analyzed for each of the bases, from the actual capture data depicted in FIG. 16, "packets No. 1 through 6 and 11 through 19" are integrated in an Osaka base, and "packets No. 7 through 10" are integrated in an Fukuoka base. In a case of measuring for each of the subnets, from the actual capture data depicted in FIG. 18, preferably, the packets No. 1 through 19 are divided and integrated into 3 subnets such as a subnet for the "packets No. 1 through 6, 11 through 13, and 17 through 19", a subnet for the "packets No. 7 through 10", and a subnet for the "packets No. 14 through 16". Furthermore, in a case of analyzing the quality characteristics for each of the client terminals 13, preferably, the packets No. 1 through 19 are divided and integrated into four clients such as a client for the "packets No. 1 through 6, and 17 through 19", a client for the "packets No. 7 through 10", a client for the "packets No. 11 through 13", and a client for the "packets No. 14 through 16". The integration based on each of the conditions described above may be performed preferably by using the "initiator address" or the "destination address" included in the actual capture data depicted in FIG. 16.

Also, in a case of analyzing the quality characteristics for each of the connections for each of the client terminals, the packets No. 1 through 19 are divided and integrated into 5 connections such as a connection for the "packets No. 1 through 6", a connection for the "packets No. 7 through 10", a connection for the "packets No. 11 through 13", a connection for the "packets No. 14 through 16", and a connection for the "packets No. 17 through 19". The above described integration for each of the connections may be performed preferably by using the "initiator port number" and the "destination port number" as well as the "initiator address" and the "destination address" included in the actual capture data depicted in FIG. 16.

Furthermore, in a case of analyzing the quality characteristics for each of the sequences, the quality characteristics are analyzed based on each of the sequences, preferably, for the "packets No. 1 through 19" from the actual capture data depicted in FIG. 16. That is, in a case of analyzing the quality characteristics for each of the sequences, an integration process is not performed. The integration process are performed by the actual quality analysis part 31 based on the integration condition which is set beforehand.

<Specific Example of Quality Analysis>

The RTT quality, the jitter quality, and the like may be analyzed by using the time interval between Syn-Ack and Ack when the TCP_3Way handshake is conducted (preferably, an interval from when the packet No. 2 in FIG. 16 is acquired to when the packet No. 3 in FIG. 16 is acquired).

Also, an interval of Ack with respect to the response data may be used. In FIG. 16, preferably, an interval between the packets No. 5 and No. 6 (20 msec), an interval between the packets No. 9 and No. 10 (50 msec), an interval between the packets No. 12 and No. 13 (22 msec), an interval between the packets No. 15 and No. 16 (24 msec), an interval between the packets No. 18 and No. 19 (22 msec), or the like may be used. Also, in a case of integrating multiple results described above, an average (a maximum or minimum average) or the standard deviation may be calculated.

Preferably, the loss quality is analyzed by using a packet transmission number and a packet loss number to calculate "loss rate (%)={packet loss number/(packet transmission number+packet loss number)}*100.0". The packet loss may be determined by analyzing a packet resend of the same sequence number (which may be the packet No. 9 for the packet No. 8 in FIG. 16) and the like. As described above, the analysis of the packet loss is not limited to a specific method but may be performed by a method for analyzing the packet resend, a method using an analysis of the TCP sequence number omission, a duplicate Ack, a resend packet, and the like.

For the above described integration of the quality characteristics, the integration condition may be set beforehand by the user, or may be dynamically set from the actual capture data. An example of dynamically determining the quality analysis subject will be described below as a fourth embodiment.

Fourth Embodiment

The fourth embodiment illustrates an example for dynamically determining subjects from which the quality characteristics are integrated, from an analysis result of actual capture data. FIG. 20 is a diagram for explaining a dynamic determination of the quality analysis subjects. In an example in FIG. 20, the "quality integration subject to be applied as a result of the dynamic determination" and the "RTT quality (msec)" correspond to each other and are stored. Preferably, items of the "RTT quality" may be, but are not limited to, a "base ID and integration quality", a "subnet ID and integration quality", a "client ID and integration quality", a "connection ID and integration quality", and the like.

The example in FIG. 20 indicates results from analyzing the RTT quality from the actual capture data for each of integration subject levels (preferably, a base level, a subnet level, a client level, and a connection level)

In the fourth embodiment, the analysis at each of the integration subject levels is conducted by the actual quality analysis part 31. In the fourth embodiment, it is dynamically determined which integration level of the quality is a reproduction subject. In the fourth embodiment, the RTT quality is taken for instance. However, it is not limited to the RTT quality. The packet loss or the jitter (fluctuation) may be processed in the same manner.

In the fourth embodiment, if there is no big difference between the integration quality of a certain upper level and the integration quality of a lower level than that level (no difference greater than or equal to a threshold set beforehand), the integration quality of the upper level is applied. In the fourth embodiment, levels may be hierarchically defined from a top level such as a "base level"→a "subnet level"→a "client level"→a "connection level". However, a level structure is not limited to this example.

In the example in FIG. 20, preferably, the RTT quality where the base ID indicates P1 and the RTT qualities where the subnet IDs corresponding to P1 are S1, S2, and S3, respectively, are analyzed. The quality "19 msec" of S1 and the quality "20 msec" of S2 are closer to the quality "20 msec" of P1. Thus, the quality "20 msec" of P1 is adopted. However, the quality "30 msec" of S3 is greatly different from the quality "20 msec" of P1. Hence, in the fourth embodiment, it is determined whether the integration at a further lower level is to be used.

In the subnet S3, the RTT qualities where the client IDs indicate T7, T8, T9, and T10 are analyzed. The qualities of T7 and T8 are closer to the quality "30 msec" of the subnet S3. Hence, the quality "30 msec" of the subnet S3 is adopted. However, the quality "40 msec" of T9 and the quality "20 msec" of T10 are greatly different from the quality "30 msec" of the subnet S3. In the fourth embodiment, it is further determined whether the integration at a further lower level is to be used. Regarding T9 and T10 of the client IDs, connection IDs being respective lower levels are closer such as C11 and C12. Hence, the qualities of the clients T9 and T10 themselves are adopted. As described above, by the quality analysis, it is possible to dynamically determine an integration position of an actual quality analysis and acquire an adequate quality.

FIG. 21 is a flowchart for explaining an example of a dynamic determination process of the quality analysis subjects. Preferably, a quality comparison among levels may be performed by determining based on a predetermined threshold as a reference whether an average of lower levels is within a statistical range derived from the average of the upper levels and the standard deviation (preferably, within 90% (the average±1.65σ)).

As an assumption of the dynamic determination process in FIG. 21, the levels of the quality analysis subjects are defined from a broad area (the upper level) such as the "base"→the "subnet"→the "client"→the "connection"→the "sequence". However, a level definition is not limited to this manner. Also, the quality for each of the levels as illustrated in FIG. 20 may be extracted by a capture analysis beforehand.

In the dynamic determination process illustrated in FIG. 21, each of the bases as a highest level is set as an initial level (step S91), and it is determined whether there is a current analysis subject at the base (step S92). When there is the analysis subject (YES of step S92), it is determined whether there is one level (the lower level) below a current level (step S93). There is not one level below (NO of step S93), the quality of the current level is adopted as the integration quality (step S94). The dynamic determination process returns to a process of step S92, and conducts the above described process for a next analysis subject.

In the dynamic determination process, when there is one level below (YES of step S93), the quality of the current level is compared with the quality of one level below and it is determined whether there is a big difference between the current level and the one level below (step S95). The big difference may be defined by determining whether a difference between compared qualities is within a predetermined range. However, the determination of the big difference is not limited to this manner. In the dynamic determination process, there is not the big difference (NO of step S95), the quality level of a current compared subject is lowered one level (step S96). The dynamic determination process returns a process of step S93. On the other hand, when there is the big difference (YES of step S95), the current level is set as the quality analysis subject (step S97). The dynamic determination process returns the process of step S92, and the above described process is repeated for a next analysis subject.

When there is no analysis subject (NO of step S92), the dynamic determination process is terminated. According to the above described fourth embodiment, it is possible to suppress, at the minimum, lowering the current level unnecessarily and adopting quality integration data to be the subject at the lower level. That is, in the fourth embodiment, with suppressing a shortage of a resource capacity such as memory and deterioration of a process speed due to an increase of data amount, it is possible to perform the verification with a further appropriate reproduction quality.

According to the above described embodiments, it is possible to appropriately reproduce the actual quality characteristics, and to adequately verify the operations (the behaviors) of the servers and the entire system in the verification operation based on the reproduced quality and the like.

In the related art, it is not possible to reproduce network quality and the like between each of the clients and the capture point. Thus, it is difficult to measure a value to be measured at a location where each of the clients is arranged, and to adequately compare the actual operation and the verification operation even by using the measured value. Moreover, a load pattern, timing, and the like are different between the actual server and the verification server. Hence, server verification with the same condition has not been realized. However, according to the embodiments, it is possible to adequately reproduce even quality characteristics at one location where the verification apparatus is arranged, pertinent to communication capture data between the verification subject apparatus such as the server and clients at multiple bases, and to verify the reproduced operation. That is, according to the embodiments, it is possible to measure quality performance (a response time or the like) at the clients of the multiple bases from one location. Thus, it is possible to significantly reduce expense and time. Moreover, according to the embodiments, it is possible to compare the capture result and the verification result as they are. As a result, it is possible to significantly reduce the expense and the time pertinent to a result comparison.

According to the embodiments, in a verification test field related to the server and the system, it is possible to realize the verification in which an actual access, load pattern, and the like are adequately reproduced.

Hence, it is possible to appropriately reproduce and verify the actual operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to perform a verification process comprising:
   collecting actual capture data of a system operation in a service pertinent to communications among multiple client terminals;
   classifying quality analysis subjects concerning the communications among the multiple client terminals;
   analyzing quality characteristics of the communication for each of the quality analysis subjects from the actual capture data;

applying quality characteristics of an upper level as current quality characteristics when a difference between the quality characteristics of the upper level and quality characteristics of a lower level is within a threshold;

generating send data based on the actual capture data and an exchanging message which is acquired when a reproduced operation is verified based on the actual capture data;

sending the send data to a verification subject apparatus at sending timing based on the current quality characteristics;

receiving response data from the verification subject apparatus; and verifying an operation of the verification subject apparatus.

2. The non-transitory computer-readable recording medium as claimed in claim 1, wherein as the quality characteristics, a Round Trip Time is analyzed for each of the quality analysis subjects from the actual capture data; and it is determined, based on an analyzed Round Trip Time quality, whether to send the send data by delaying for the Round Trip Time, or it is determined whether to permit sending of the send data based on information of time traced back for the Round Trip Time.

3. The non-transitory computer-readable recording medium as claimed in claim 1, wherein as the quality characteristics, data loss quality is analyzed for each of the quality analysis subjects from the actual capture data, and it is determined whether to send the send data.

4. The non-transitory computer-readable recording medium as claimed in claim 1, wherein as the quality characteristics, a jitter quality is analyzed for each of the quality analysis subjects from the actual capture data, and based on an analyzed jitter quality, the send data are sent to the verification subject apparatus.

5. The non-transitory computer-readable recording medium as claimed in claim 1, wherein while analyzing the quality characteristics from the actual capture data, the send data are sent to the verification subject apparatus based on the quality characteristics.

6. The non-transitory computer-readable recording medium as claimed in claim 1, wherein the quality analysis subjects correspond to at least one of each of bases, each of sub-networks, each of clients, each of connections, and each of sequences.

7. The non-transitory computer-readable recording medium as claimed in claim 1, based on the quality characteristics analyzed using the actual capture data, the quality analysis subjects are dynamically determined.

8. An information processing apparatus comprising:
a processor; and
a storage device;
wherein the processor performs a verification process including:

collecting actual capture data of a system operation in a service pertinent to communications among multiple client terminals;

classifying quality analysis subjects concerning the communications among the multiple client terminals;

analyzing Quality characteristics of the communication for each of the Quality analysis subjects from the actual capture data;

applying quality characteristics of an upper level as current quality characteristics when a difference between the quality characteristics of the upper level and quality characteristics of a lower level is within a threshold;

generating send data based on actual capture data and an exchanging message which is acquired when a reproduced operation is verified based on the actual capture data;

sending the send data to a verification subject apparatus at sending timing based on the current quality characteristics;

receiving response data from the verification subject apparatus; and verifying an operation of the verification subject apparatus.

9. An information processing method performed in a computer, the method comprising:

collecting, by the computer, actual capture data of a system operation in a service pertinent to communications among multiple client terminals;

classifying, by the computer, quality analysis subjects concerning the communications among the multiple client terminals;

analyzing, by the computer, quality characteristics of the communication for each of the quality analysis subjects from actual capture data;

applying, by the computer, quality characteristics of an upper level as current Quality characteristics when a difference between the Quality characteristics of the upper level and quality characteristics of a lower level is within a threshold;

generating, by the computer, send data based on the actual capture data and an exchanging message which is acquired when a reproduced operation is verified based on the actual capture data;

sending the send data to a verification subject apparatus at sending timing based on the current quality characteristics;

receiving response data from the verification subject apparatus; and verifying, by the computer, an operation of the verification subject apparatus.

* * * * *